United States Patent
Ito et al.

(10) Patent No.: US 12,048,392 B2
(45) Date of Patent: Jul. 30, 2024

(54) BEVERAGE SUPPLY APPARATUS

(71) Applicant: FUJI ELECTRIC CO., LTD., Kawasaki (JP)

(72) Inventors: Shuichi Ito, Yokkaichi (JP); Kousuke Kajiki, Yokkaichi (JP); Yukihide Mochida, Yokkaichi (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 803 days.

(21) Appl. No.: 17/159,757

(22) Filed: Jan. 27, 2021

(65) Prior Publication Data

US 2021/0145204 A1    May 20, 2021

Related U.S. Application Data

(63) Continuation of application No. PCT/JP2019/034484, filed on Sep. 2, 2019.

(30) Foreign Application Priority Data

| Sep. 14, 2018 | (JP) | 2018-173088 |
| Sep. 14, 2018 | (JP) | 2018-173098 |
| Sep. 18, 2018 | (JP) | 2018-174284 |

(51) Int. Cl.
| A47J 31/32 | (2006.01) |
| A47J 31/42 | (2006.01) |
| A47J 31/44 | (2006.01) |

(52) U.S. Cl.
CPC .............. *A47J 31/32* (2013.01); *A47J 31/42* (2013.01); *A47J 31/4407* (2013.01)

(58) Field of Classification Search
CPC ......... A47J 31/32; A47J 31/42; A47J 31/4407
See application file for complete search history.

(56) References Cited

U.S. PATENT DOCUMENTS

| 3,379,116 A | 4/1968 | Martin et al. |
| 5,896,805 A * | 4/1999 | Katou ............... A47J 31/32 |
| | | 426/433 |

(Continued)

FOREIGN PATENT DOCUMENTS

| CN | 206518464 U | 9/2017 |
| JP | S59-147283 U | 10/1984 |

(Continued)

OTHER PUBLICATIONS

China National Intellectual Property Administration, "Office Action with Search Report for Chinese Patent Application 201980051904. 8," May 18, 2022.

(Continued)

*Primary Examiner* — Sean M Michalski
(74) *Attorney, Agent, or Firm* — HAUPTMAN HAM, LLP

(57) ABSTRACT

A beverage supply apparatus includes: a grinder configured to grind an ingredient; a hot-water supply unit configured to supply hot water; an extractor, to which the ingredient ground by the grinder, the hot water supplied by the hot-water supply unit, and pressurized air to stir the ingredient and the hot water are supplied; and a control unit configured to perform control to supply the pressurized air to the extractor to stir the ingredient and the hot water and, after the stirring, further supply pressurized air for extraction to the extractor to extract and supply beverage to a container. Further, the control unit controls the hot-water supply unit to add the hot water to the extractor during extraction of the beverage when a supply amount of the beverage to the container is equal to or larger than a volume of the extractor.

8 Claims, 33 Drawing Sheets

(56) References Cited

U.S. PATENT DOCUMENTS

| | | | | |
|---|---|---|---|---|
| 5,937,738 | A * | 8/1999 | Okamura | A47J 31/32 |
| | | | | 99/302 R |
| 6,079,317 | A * | 6/2000 | Fukushima | A47J 31/408 |
| | | | | 99/302 R |
| 8,127,664 | B2 * | 3/2012 | Nielsen | A47J 31/005 |
| | | | | 99/302 R |
| 10,105,003 | B2 * | 10/2018 | Tsutsumi | A47J 31/52 |
| 10,779,675 | B2 * | 9/2020 | Ford | A47J 31/06 |
| 11,825,982 | B2 * | 11/2023 | Vastardis | A47J 31/44 |
| 2009/0029021 | A1 * | 1/2009 | Nielsen | A47J 31/32 |
| | | | | 99/302 R |
| 2010/0140881 | A1 | 6/2010 | Matsuo | |
| 2015/0208850 | A1 * | 7/2015 | Bishop | A47J 31/043 |
| | | | | 99/280 |
| 2015/0374164 | A1 | 12/2015 | Suzuki et al. | |
| 2016/0058241 | A1 * | 3/2016 | Tsutsumi | A47J 31/5251 |
| | | | | 99/283 |
| 2016/0235245 | A1 * | 8/2016 | Hanes | A47J 31/56 |
| 2017/0303712 | A1 * | 10/2017 | Pisarevsky | A47J 31/32 |
| 2017/0347827 | A1 * | 12/2017 | Almblad | A47J 31/20 |
| 2017/0367518 | A1 * | 12/2017 | Anthony | A47J 31/0657 |
| 2018/0352994 | A1 * | 12/2018 | Illy | A47J 31/4403 |
| 2018/0360256 | A1 * | 12/2018 | Ford | A47J 31/0657 |

FOREIGN PATENT DOCUMENTS

| | | |
|---|---|---|
| JP | H11-003466 A | 1/1999 |
| JP | 2006-190238 A | 7/2006 |
| JP | 2008-168113 A | 7/2008 |
| JP | 2008-281110 A | 11/2008 |
| JP | 2010-179093 A | 8/2010 |
| JP | 2011-033082 A | 2/2011 |
| JP | 2012-142025 A | 7/2012 |
| WO | 2016/132412 A1 | 8/2016 |

OTHER PUBLICATIONS

PCT/ISA/237; Written Opinion of the International Searching Authority issued Nov. 19, 2019 in International (PCT) Application No. PCT/JP2019/034484.

PCT/ISA/210; International Search Report issued Nov. 19, 2019 in International (PCT) Application No. PCT/JP2019/034484.

* cited by examiner

FIG.5
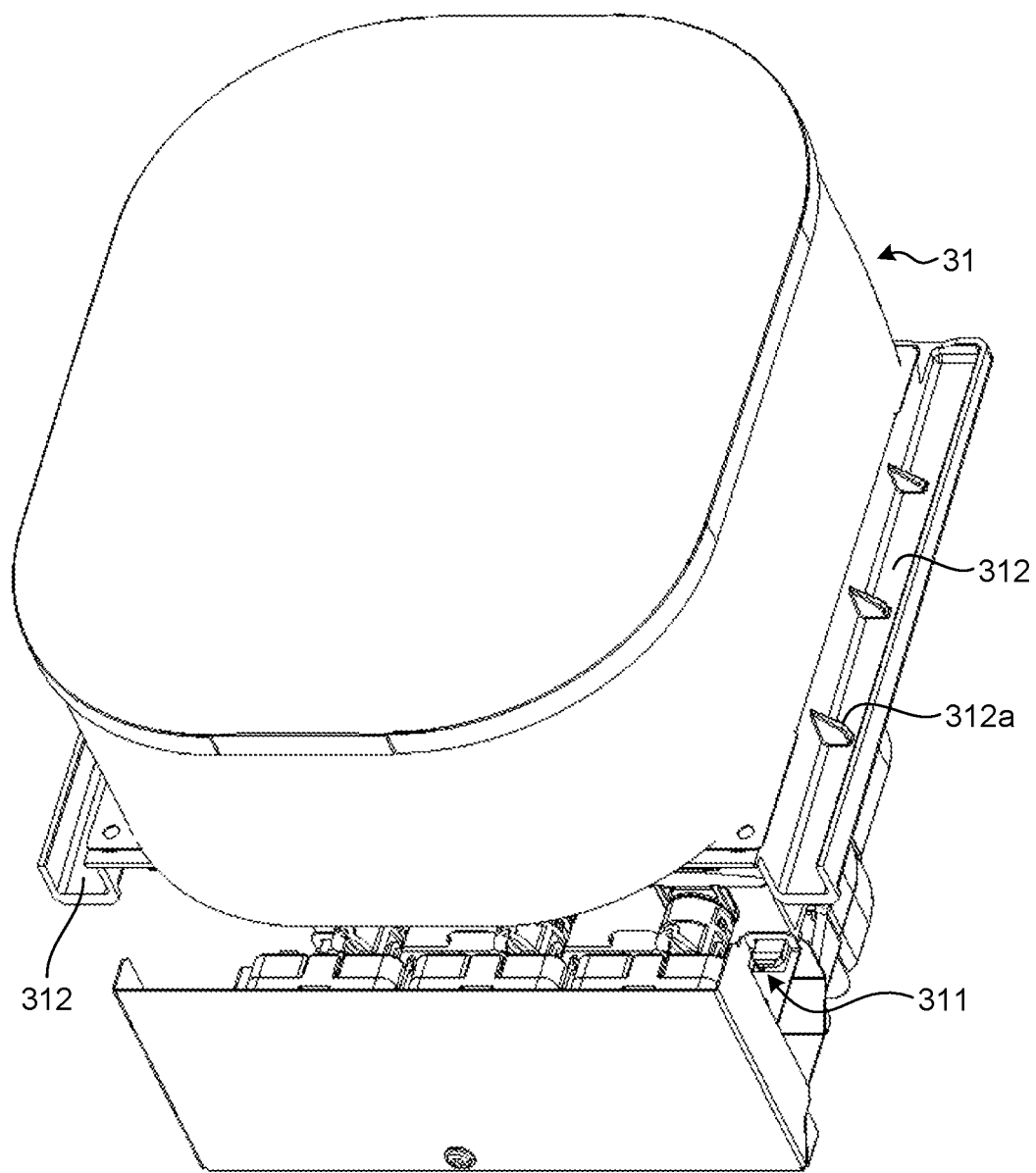
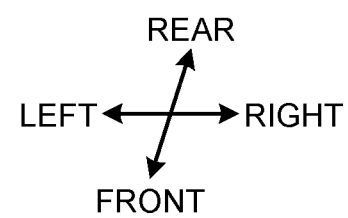

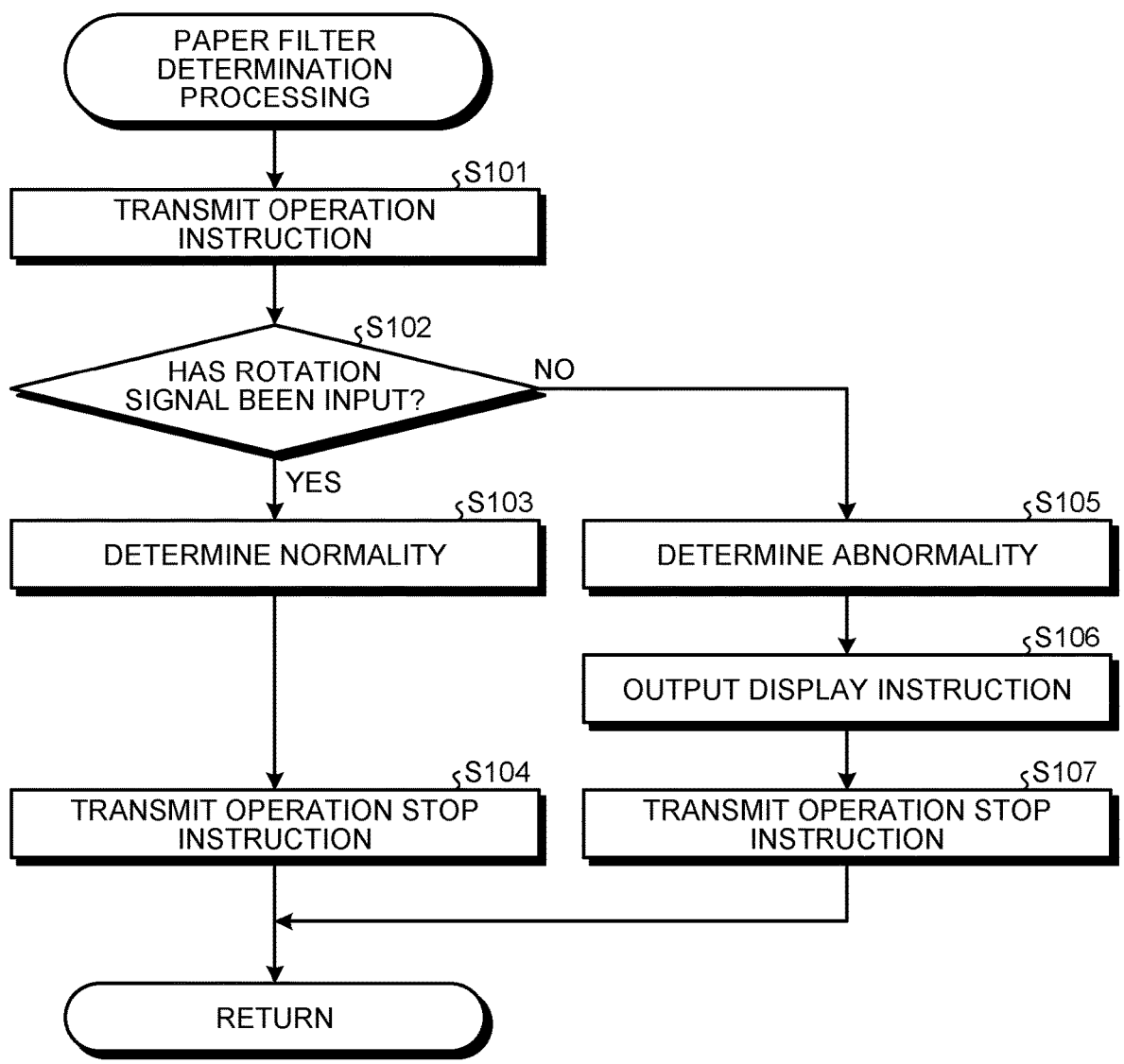

BEVERAGE SUPPLY APPARATUS

CROSS-REFERENCE TO RELATED APPLICATION(S)

This application is a continuation of International Application No. PCT/JP2019/034484, filed on Sep. 2, 2019 which claims the benefit of priority of the prior Japanese Patent Application Nos. 2018-173088, 2018-173098, and 2018-174284 filed on Sep. 14, 2018, Sep. 14, 2018, and Sep. 18, 2018, respectively, the entire contents of which are incorporated herein by reference.

BACKGROUND

The present disclosure relates to a beverage supply apparatus.

In the related art, a beverage supply apparatus that supplies a beverage to a container has been proposed in Japanese Patent Laid-open Patent Publication No. 2006-190238. The beverage supply apparatus proposed in Patent Literature 1 supplies pressurized air for stirring to an extractor into which an ingredient ground by a grinder has been put and to which hot water is supplied by a hot-water supply unit, to stir the ingredient and the hot water. Thereafter, the beverage supply apparatus supplies pressurized air for extraction to the extractor to extract a beverage and supplies the beverage to a container such as a cup.

Although not clearly described in Japanese Patent Laid-open Patent Publication No. 2006-190238 mentioned above, when the supply amount of the beverage to the container is equal to or larger than the volume of the extractor, the following process is performed in general. That is, the hot water is supplied again by means of the hot-water supply unit to the extractor after extraction of the beverage by supply of the pressurized air for extraction, and then, the pressurized air for stirring is supplied thereto for stirring. Thereafter, the pressurized air for extraction is supplied again to the extractor to extract the beverage, and the beverage is supplied to the container. As described above, stirring is performed after the hot water is supplied again, resulting in increase in time taken to supply the beverage to the container.

SUMMARY

There is a need for providing a beverage supply apparatus capable of shortening beverage supply time even when the supply amount of a beverage to a container is equal to or larger than the volume of an extractor.

According to an embodiment, a beverage supply apparatus includes: a grinder configured to grind an ingredient; a hot-water supply unit configured to supply hot water; an extractor, to which the ingredient ground by the grinder, the hot water supplied by the hot-water supply unit, and pressurized air to stir the ingredient and the hot water are supplied; and a control unit configured to perform control to supply the pressurized air to the extractor to stir the ingredient and the hot water and, after the stirring, further supply pressurized air for extraction to the extractor to extract and supply beverage to a container. Further, the control unit controls the hot-water supply unit to add the hot water to the extractor during extraction of the beverage when a supply amount of the beverage to the container is equal to or larger than a volume of the extractor.

BRIEF DESCRIPTION OF DRAWINGS

FIG. 5 is a perspective view illustrating an ingredient box illustrated in FIG. 2;

FIG. 33 is a flowchart illustrating processing contents of paper filter determination processing that a setting controller illustrated in FIG. 2 executes.

DETAILED DESCRIPTION

Hereinafter, a preferred embodiment of a beverage supply apparatus according to the present disclosure will be described in detail with reference to the accompanying drawings.

Figure 1:
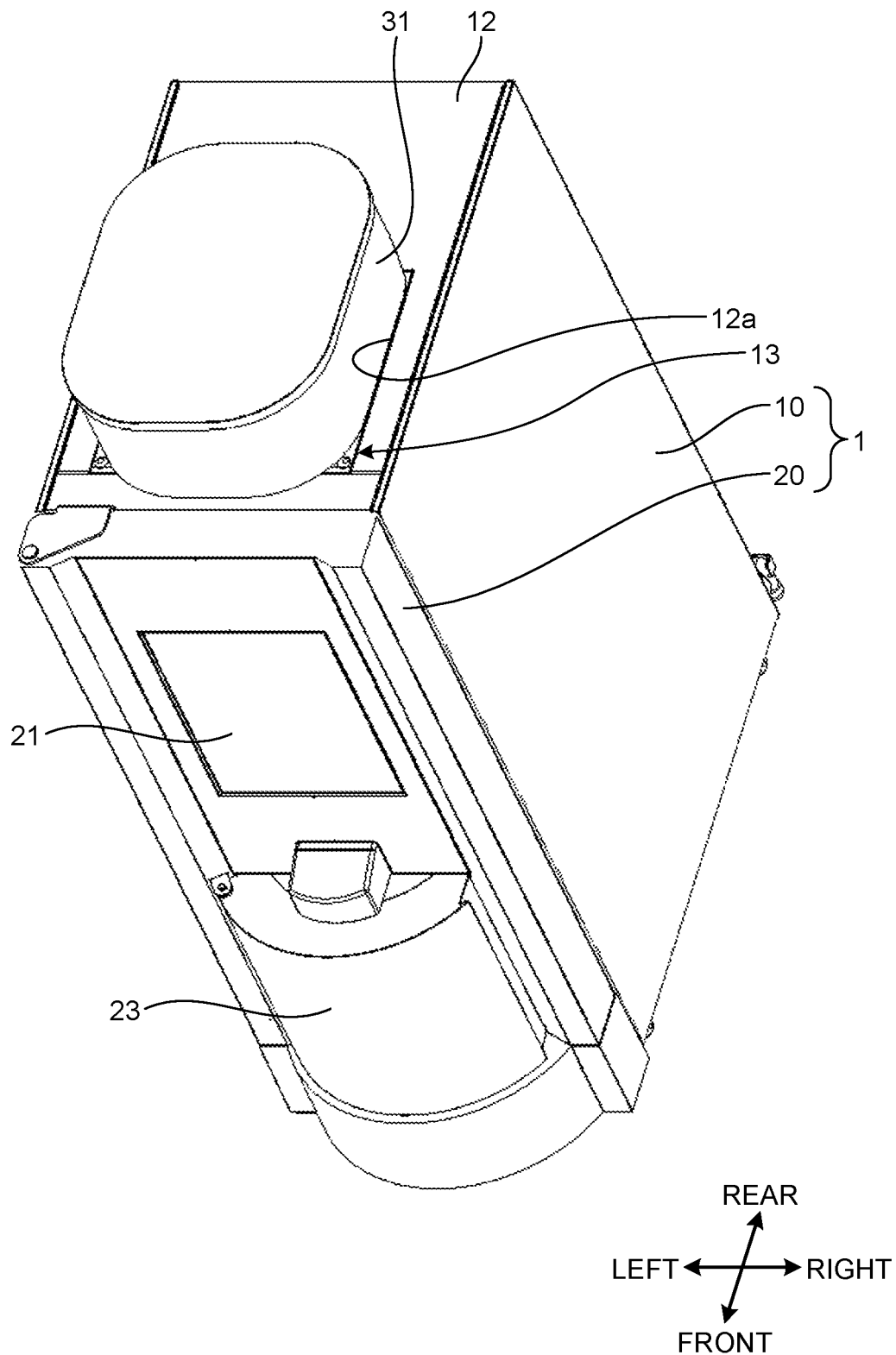
FIG. 1 is a perspective view illustrating the appearance configuration of a beverage supply apparatus as an embodiment of the present disclosure.
Figure 2:
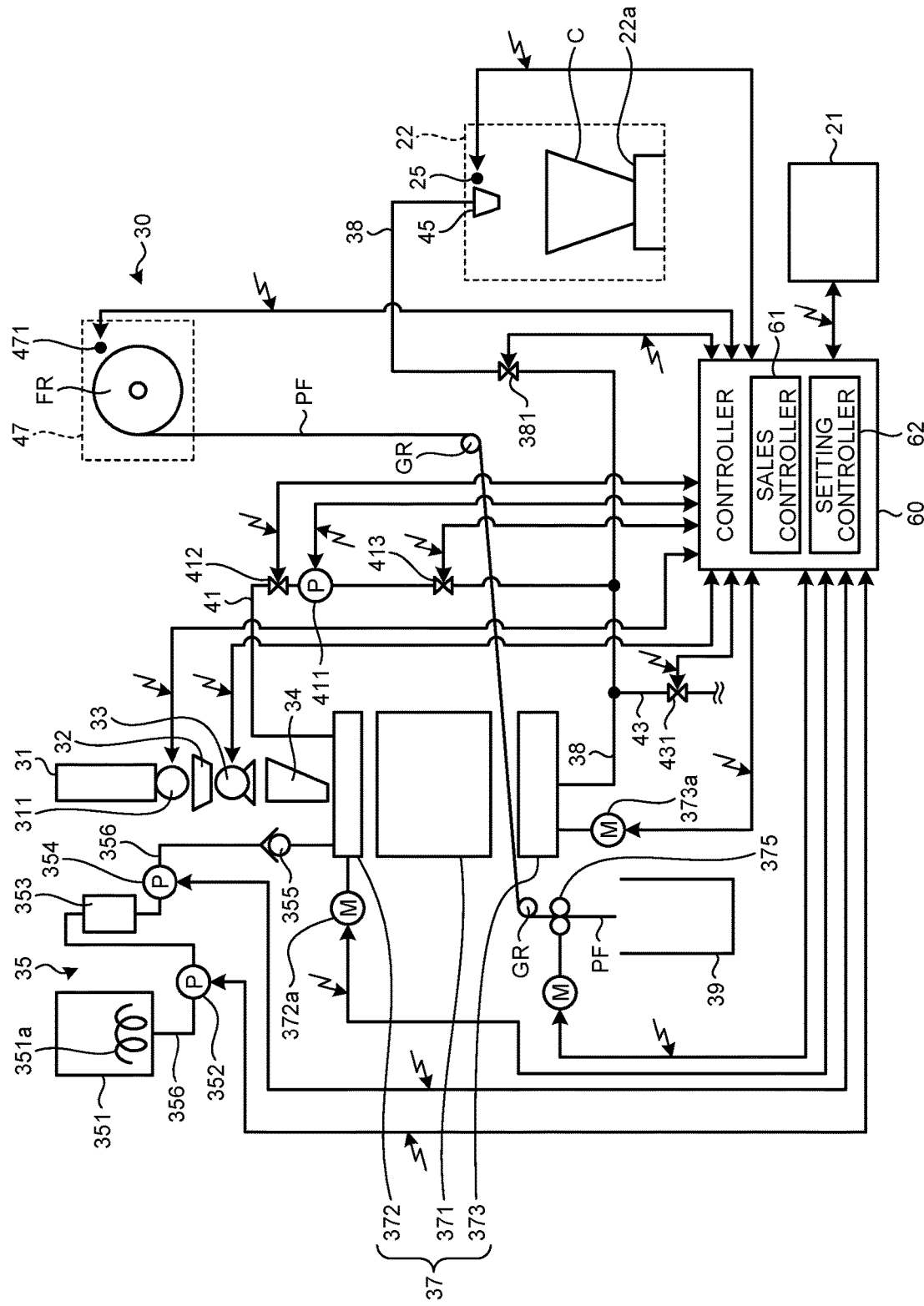
FIG. 2 is a schematic view schematically illustrating components of the beverage supply apparatus as an embodiment of the present disclosure.

FIG. 1 and FIG. 2 illustrate the beverage supply apparatus as the embodiment of the present disclosure, FIG. 1 is a perspective view illustrating the appearance configuration thereof, and FIG. 2 is a schematic view schematically illustrating components thereof. The beverage supply apparatus to be described in this example is, for example, a coffee machine that is installed in stores such as convenience stores, and supplies a beverage such as coffee to a container C such as a cup by performing coffee bean grinding and dripping extraction processing, for example. Such a beverage supply apparatus includes an apparatus main body 1.

Figure 3:
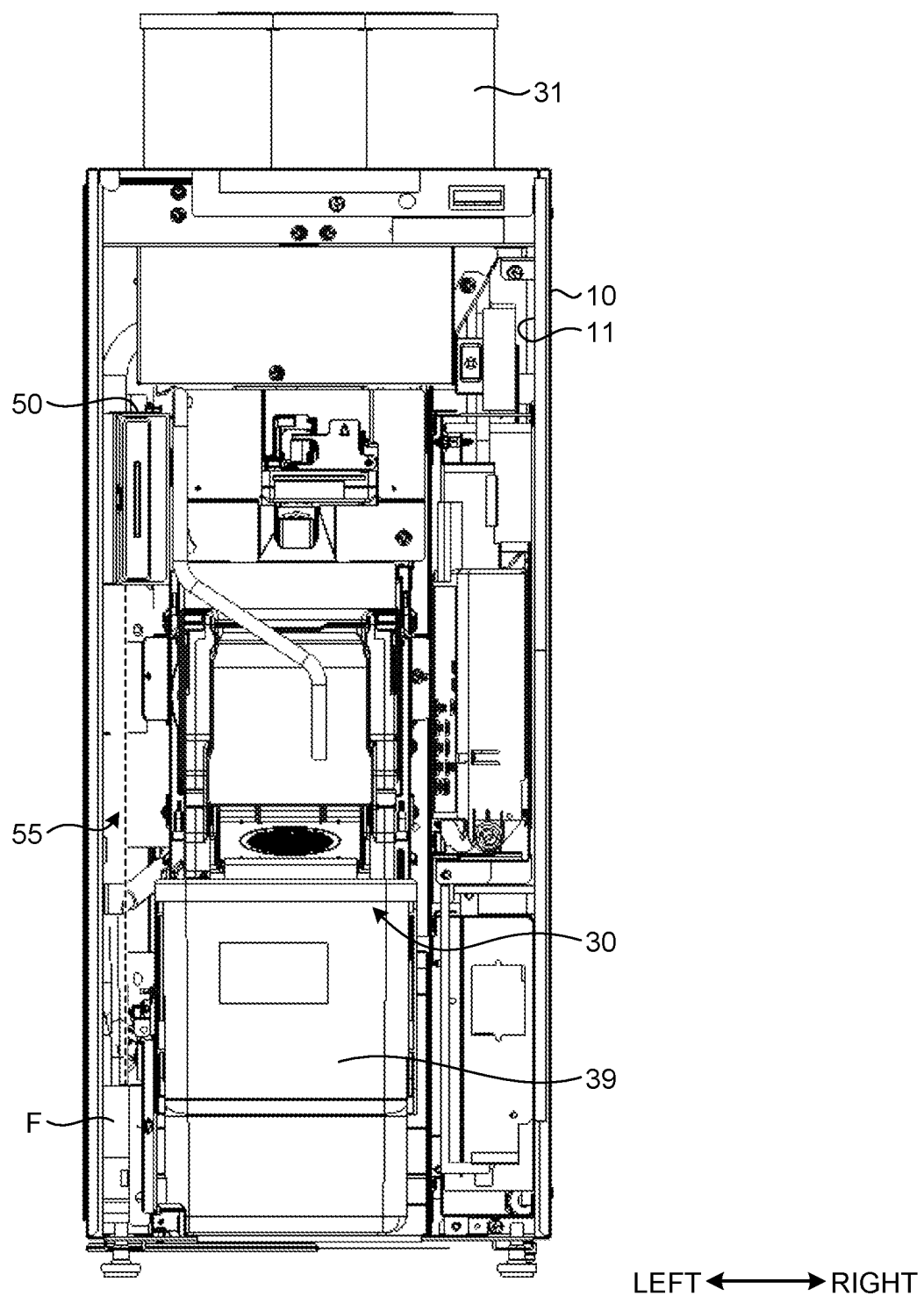
FIG. 3 is a front view illustrating the internal configuration of a main body cabinet illustrated in FIG. 1.

The apparatus main body 1 includes a main body cabinet 10 and a front door 20. As illustrated in FIG. 3, the main body cabinet 10 has an opening (hereinafter, also referred to as a front surface opening) 11 in a front surface and forms a substantially rectangular parallelepiped shape. A beverage making unit 30 configured to make the beverage (for example, coffee) and a controller (control unit) 60 are provided in the main body cabinet 10.

The front door 20 is a door body having enough size to close the front surface opening 11 of the main body cabinet 10. The front door 20 is provided to be capable of swinging about a center axis of a shaft portion (not illustrated) extending along the up-down direction in a front-side left edge portion of the main body cabinet 10 and can open and close the front surface opening 11 of the main body cabinet 10.

Figure 4:
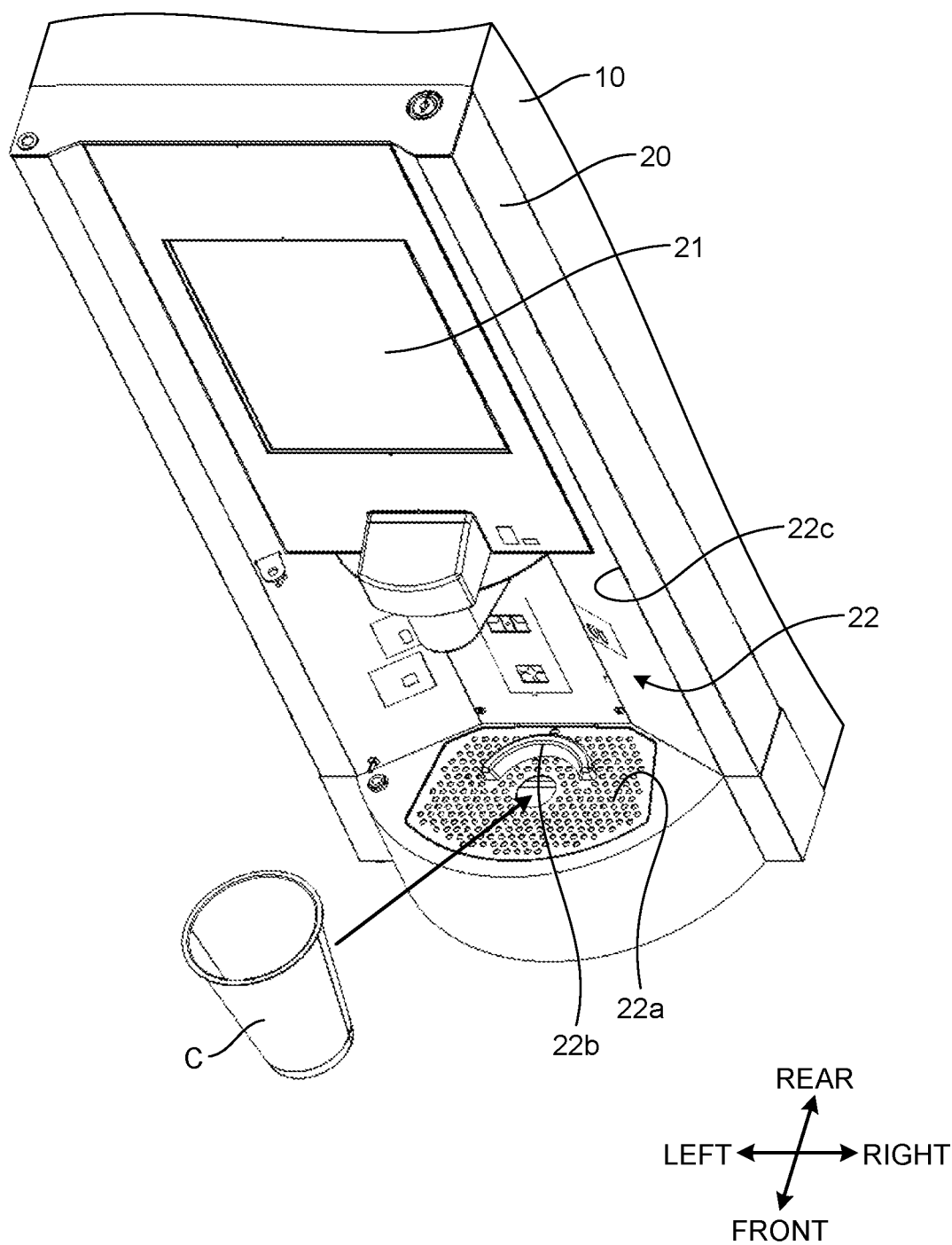
FIG. 4 is a perspective view illustrating the configuration of a front door illustrated in FIG. 1.

The front door 20 has a front surface serving as a customer surface and includes a display unit 21, a beverage supply unit 22, and an opening/closing door 23 as illustrated also in FIG. 4.

The display unit 21 is configured by, for example, a liquid crystal touch panel. The display unit 21 displays various pieces of information in accordance with instructions transmitted from the controller 60 and enables input operations such as touch operations. When the input operation such as the touch operation is performed, the display unit 21 transmits a sales signal to the controller 60.

The beverage supply unit 22 is provided under the display unit 21 and has a stage 22a. The stage 22a is a stage where a cup C is placed and has a circular arc-shaped stopper 22b.

The opening/closing door 23 is made of a translucent material such as transparent resin and has enough size to cover an entrance 22c of the beverage supply unit 22. A left end portion of the opening/closing door 23 is axially supported by the front door 20, and the opening/closing door 23 can swing along the front-rear direction. That is to say, the opening/closing door 23 can swing along the front-rear direction so as to approach or separate from the beverage supply unit 22, can close the entrance 22c of the beverage supply unit 22 when swinging rearward so as to approach the beverage supply unit 22, and can open the entrance 22c of the beverage supply unit 22 when swinging frontward so as to separate from the beverage supply unit 22.

The above-mentioned beverage making unit 30 is described. The beverage making unit 30 includes an ingredient box 31, a grinder 33, a hot-water supply unit 35, an extractor 37, an accommodation box 39, a pressurized air supply line 41, a water discharge line 43, and a nozzle 45.

Figure 6:
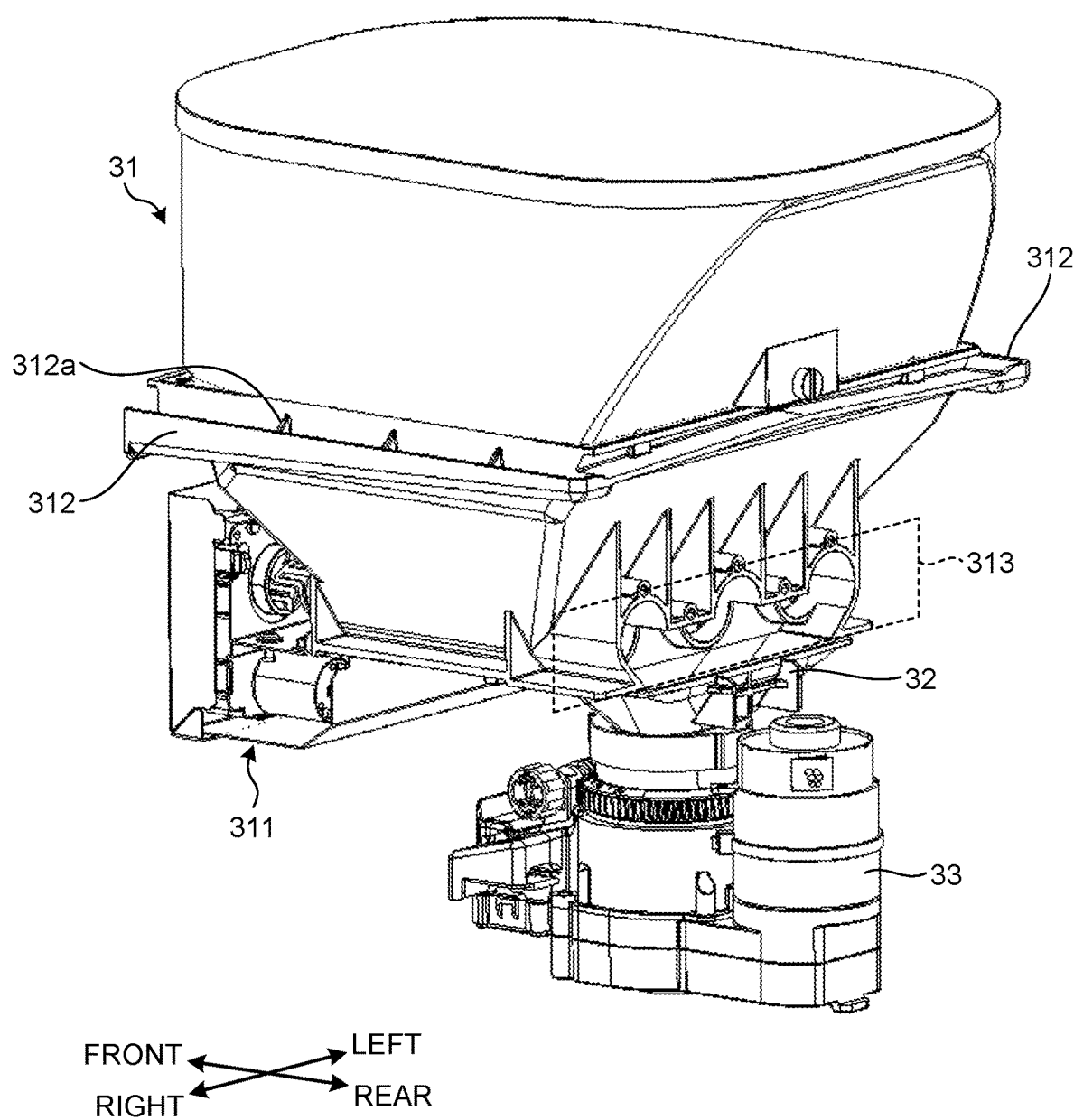
FIG. 6 is a perspective view illustrating the ingredient box illustrated in FIG. 2 and the peripheral configuration thereof.

The ingredient box 31 accommodates therein roasted coffee beans as a beverage ingredient and is provided in such a manner that a part thereof projects upward from a top plate portion 12 of the main body cabinet 10. As illustrated also in FIG. 5 and FIG. 6, the ingredient box 31 includes an ingredient supply driving unit 311. The ingredient supply driving unit 311 drives when receiving a drive instruction from the controller 60. The ingredient supply driving unit 311 dispenses the predetermined amount of coffee beans that is contained in the drive instruction.

Gutters (gutter members) 312 are provided on both of right and left end portions of the ingredient box 31. The bottom surfaces of the gutters 312 are gradually inclined downward toward the front side. The gutters 312 are provided in areas under spaces 13 in the top plate portion 12 of the main body cabinet 10, that is, the spaces 13 between parts of the ingredient box 31 projecting upward relative to the top plate portion 12 and an opening edge portion 12a of the top plate portion 12 and receive and guide liquid entering through the spaces 13 to an area outside the beverage making unit 30. A plurality of ribs 312a are mounted on the gutters 312 to improve the strength thereof.

A restraint plate 313 restraining rearward scattering of the coffee beans in dispensing of the coffee beans by the ingredient supply driving unit 311 is further mounted on the ingredient box 31, so that the coffee beans are dispensed downward.

The grinder 33 is referred to as a what-is-called mill and drives when receiving a drive instruction from the controller 60. The grinder 33 is installed in an area under the ingredient box 31 and is coupled to the ingredient box 31 through an ingredient chute 32.

Figure 7:
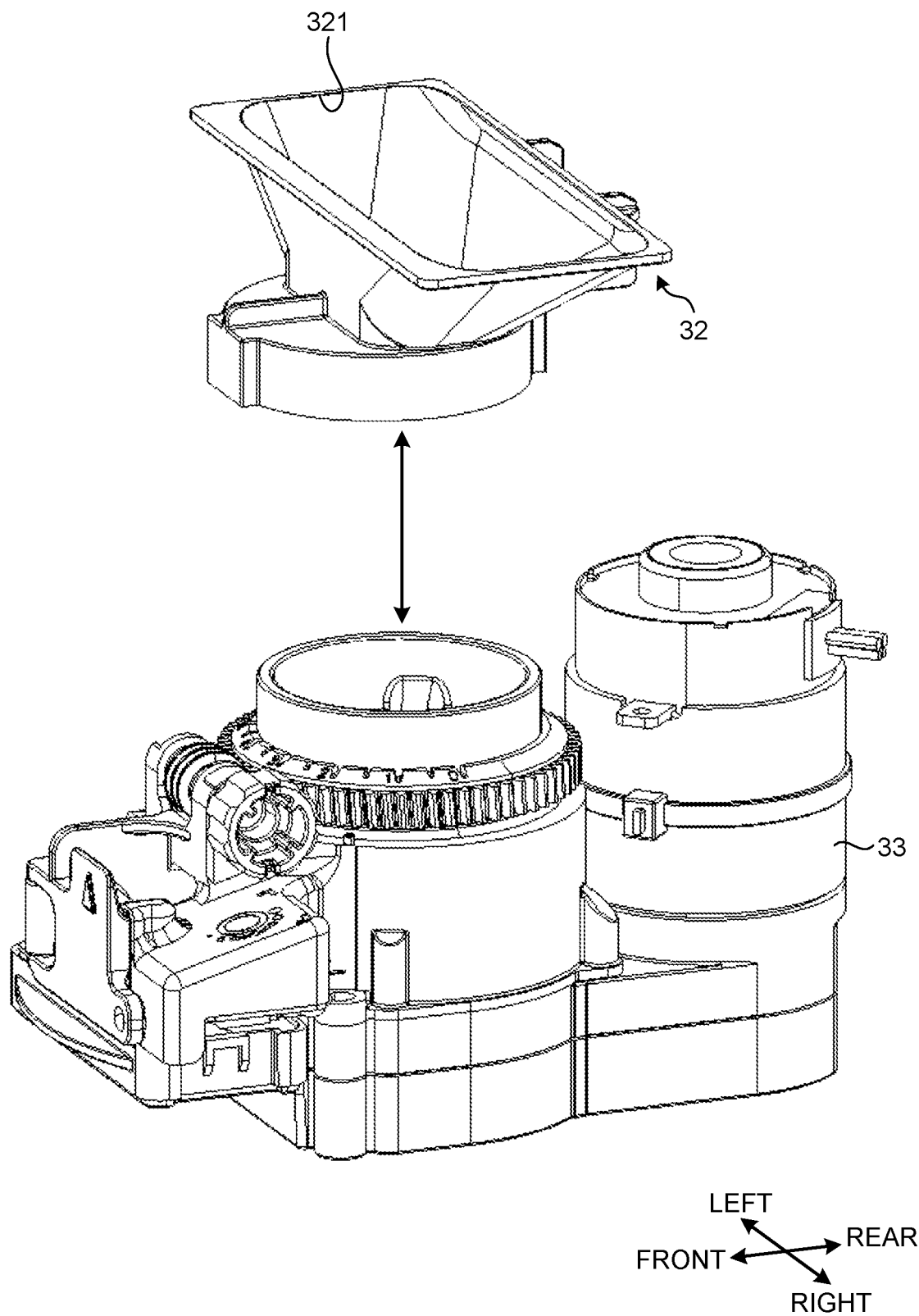
FIG. 7 is an exploded perspective view illustrating a grinder illustrated in FIG. 2 and the peripheral configuration thereof.
Figure 8:
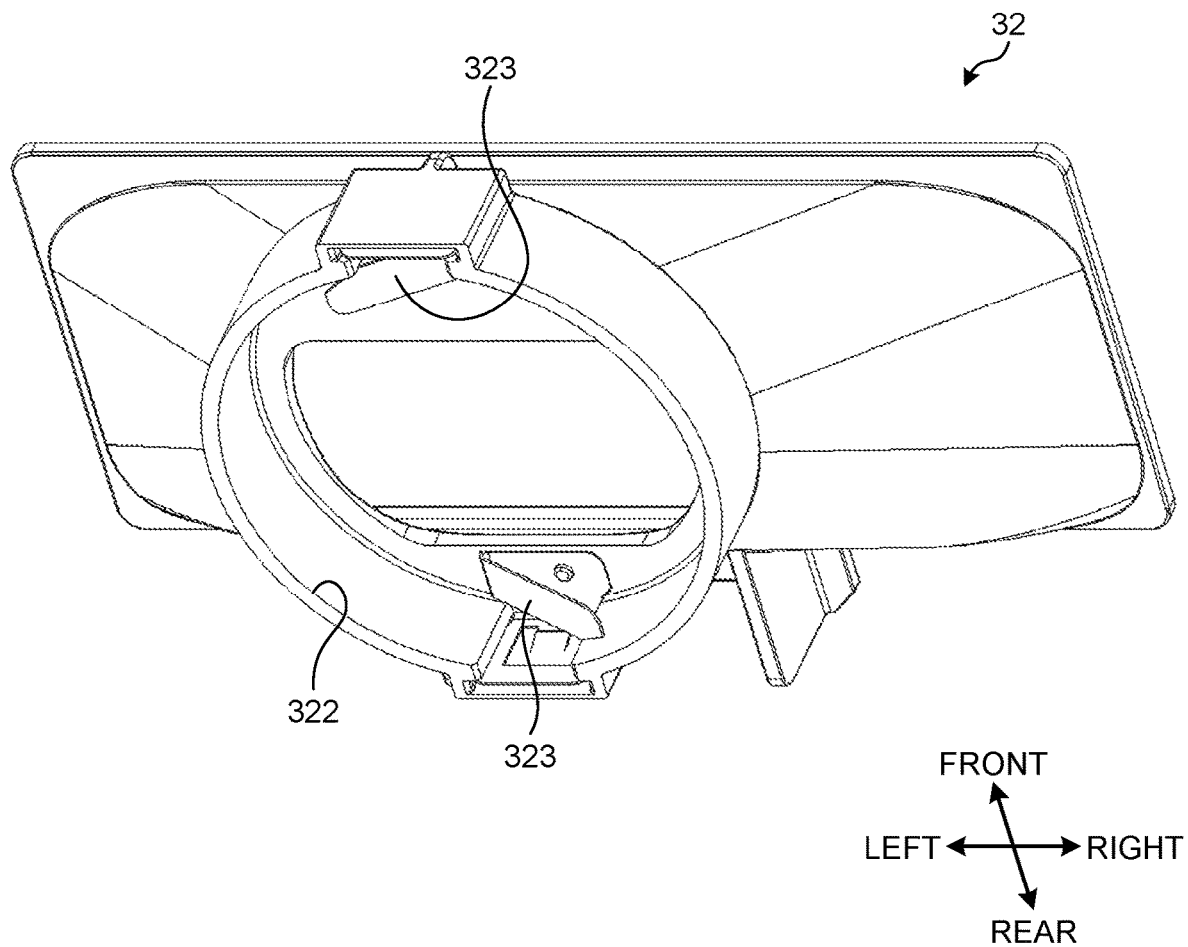
FIG. 8 is a perspective view illustrating an ingredient chute illustrated in FIG. 6 and FIG. 7.

As illustrated in FIG. 7 and FIG. 8, the ingredient chute 32 has an inlet port 321 formed in an upper portion to introduce the coffee beans dispensed from the ingredient box 31 and a drop port 322 formed in a lower portion to drop the introduced coffee beans. The ingredient chute 32 is mounted on the grinder 33 in such a manner that the drop port 322 communicates with an entrance portion of the grinder 33. A plate spring 323 is provided in a lower portion of the ingredient chute 32. The plate spring 323 abuts against a circumferential edge portion of the entrance portion of the grinder 33 to bias the ingredient chute upward with its own restoration force. That is to say, the plate spring 323 is a biasing unit interposed between the ingredient chute 32 and the grinder 33 and configured to bias the ingredient chute 32 such that the ingredient chute 32 separates from the grinder 33 and approaches the ingredient box 31.

The above-mentioned grinder 33 grinds the coffee beans dispensed from the ingredient box 31 and guided by the ingredient chute 32 and puts the coffee beans that have been ground (hereinafter, also referred to as ground coffee beans)

into the extractor 37 through a powder chute 34. The powder chute 34 is configured by integrating components with resin.

The hot-water supply unit 35 supplies hot water to the extractor 37 and is configured by sequentially coupling a hot-water tank 351, a metering pump (first feeding unit) 352, an auxiliary tank 353, a hot-water supply pump (second feeding unit) 354, and a check valve 355 to a hot-water supply line 356 configured by a hot-water supply pipe.

The hot-water tank 351 heats water such as tap water supplied from a water supply unit (not illustrated) with a heater 351a and stores therein hot water. The metering pump 352 drives in accordance with an instruction received from the controller 60 and, when driving, it feeds the fixed amount of the hot water to the auxiliary tank 353 from the hot-water tank 351. The auxiliary tank 353 has a smaller volume than that of the hot-water tank 351 and temporarily stores therein the hot water fed by the metering pump 352. The hot-water supply pump 354 drives in accordance with an instruction received from the controller 60 and, when driving, it pressurizes and feeds the hot water in the auxiliary tank 353 to the extractor 37. The feeding amount by the hot-water supply pump 354 is set to be larger than the feeding amount by the metering pump 352. The check valve 355 is a valve body that allows passage of the hot water fed by the hot-water supply pump 354 toward the extractor 37 and inhibits passage of the hot water from the extractor 37 toward the auxiliary tank 353. Although not clearly illustrated in the drawings, the check valve 355 is arranged in a state of being thermally coupled to the hot-water tank 351.

The extractor 37 is referred to as a what-is-called brewer unit and extracts coffee from the ground coffee beans put thereinto from the grinder 33 through the powder chute 34 and the hot water supplied by the hot-water supply unit 35.

A beverage supply line 38 is coupled to the extractor 37. The beverage supply line 38 is configured by a single beverage supply pipe or coupling a plurality of beverage supply pipes and supplies the coffee extracted by the extractor 37 to the nozzle 45.

A first pinch valve 381 is provided at a halfway position on the beverage supply line 38. The first pinch valve 381 opens and closes in accordance with an instruction received from the controller 60. The first pinch valve 381 allows passage of fluid in an open state and inhibits passage of the fluid in a closed state.

Figure 9:
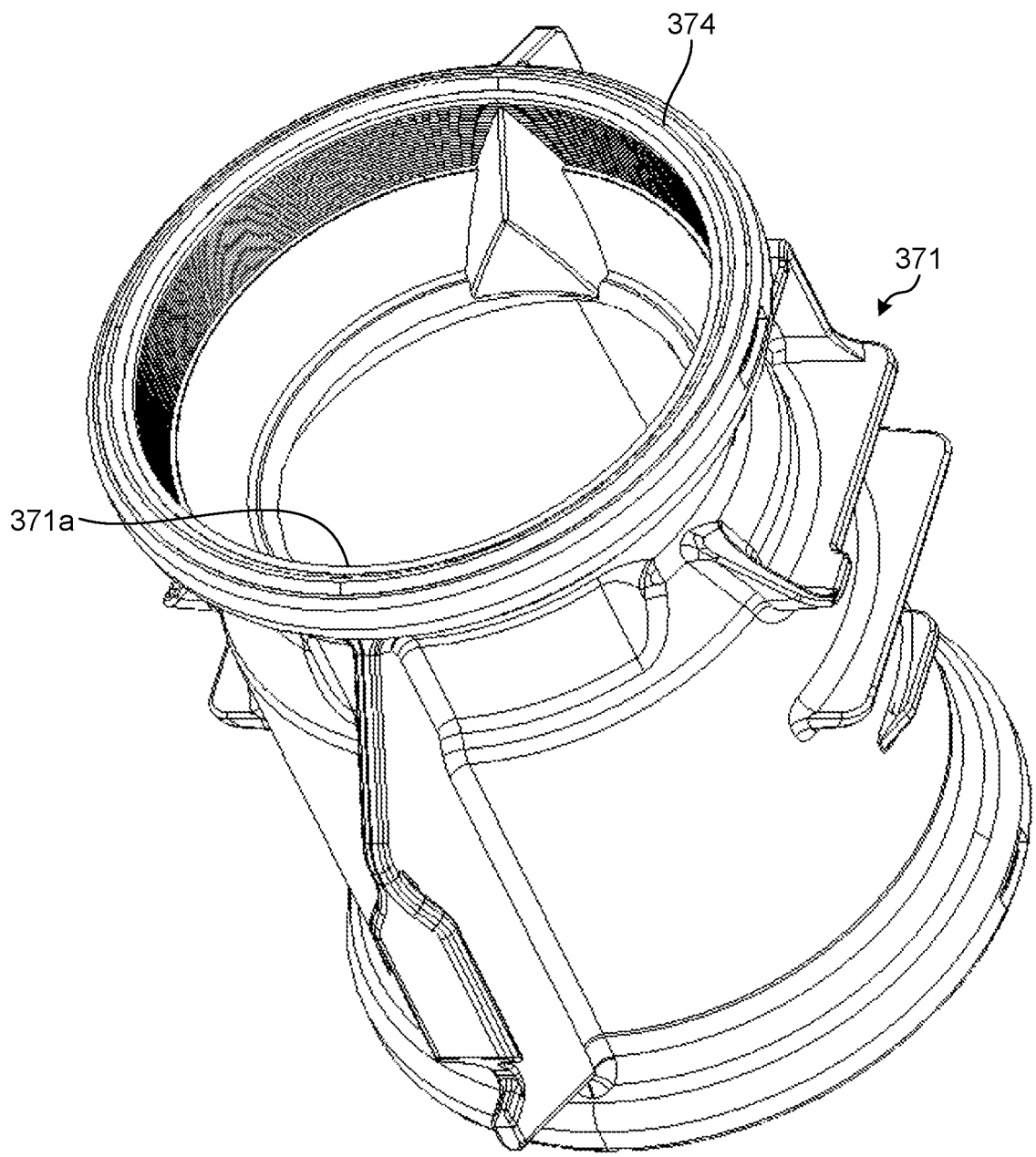
FIG. 9 is a perspective view illustrating a cylinder illustrated in FIG. 2.
Figure 10:
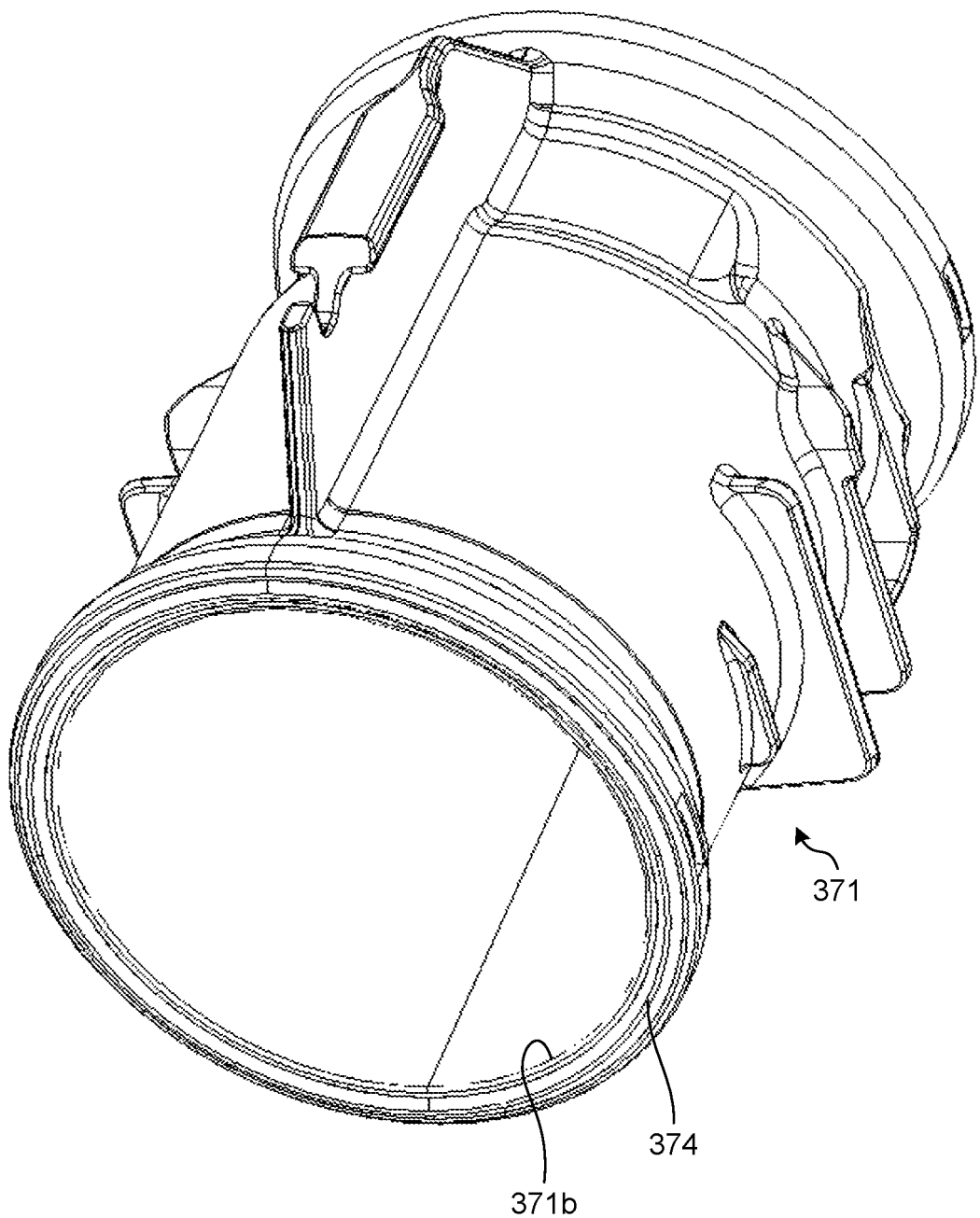
FIG. 10 is a perspective view illustrating the cylinder illustrated in FIG. 2.
Figure 11:
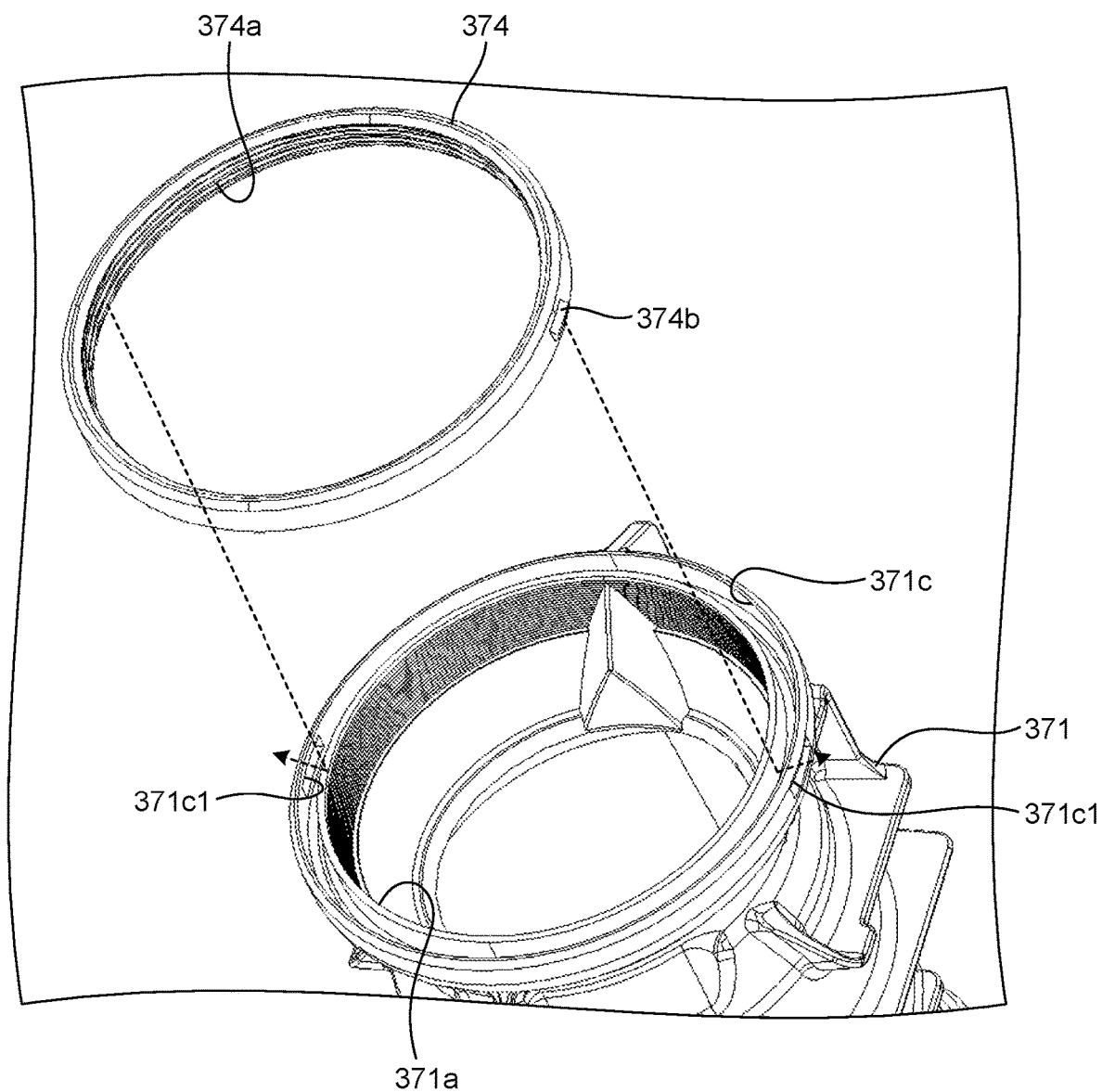
FIG. 11 is an exploded perspective view of a main part of the cylinder illustrated in FIG. 9.
Figure 12:
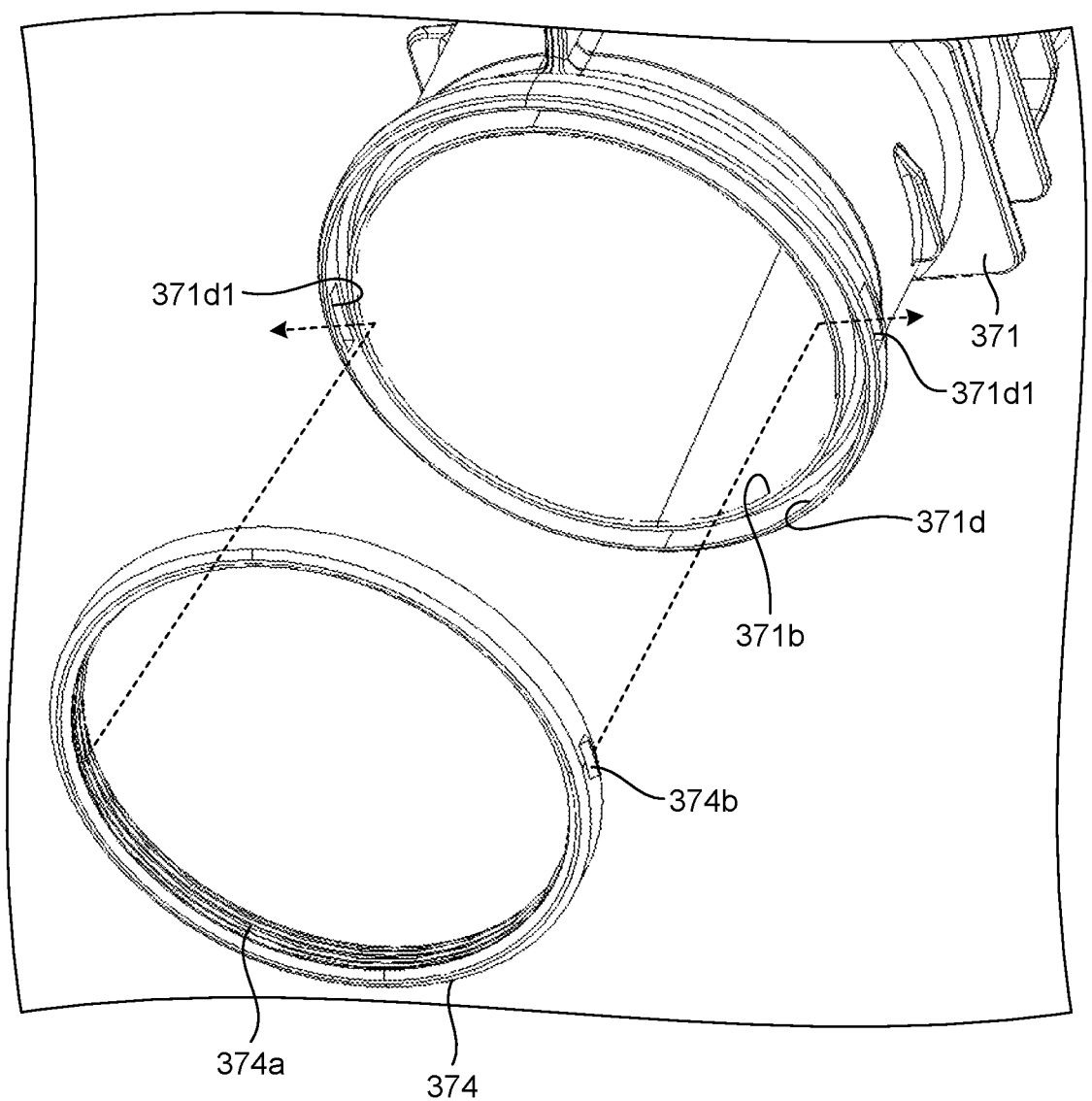
FIG. 12 is an exploded perspective view of the main part of the cylinder illustrated in FIG. 10.

The extractor 37 includes a cylinder 371, a lid body 372, and a filter block 373. FIG. 9 and FIG. 10 are perspective views illustrating the cylinder 371 included in the extractor 37. As illustrated in FIG. 9 and FIG. 10, the cylinder 371 forms a substantially cylindrical shape and is detachably mounted on the main body cabinet 10 (apparatus main body 1). As illustrated in FIG. 11 and FIG. 12, the cylinder 371 has opening edge portions of an upper surface opening 371a and a lower surface opening 371b that are sealed by respectively fitting ring-shaped seal members 374 such as packings into mounting recess portions 371c and 371d formed in the opening edge portions.

Figure 13:
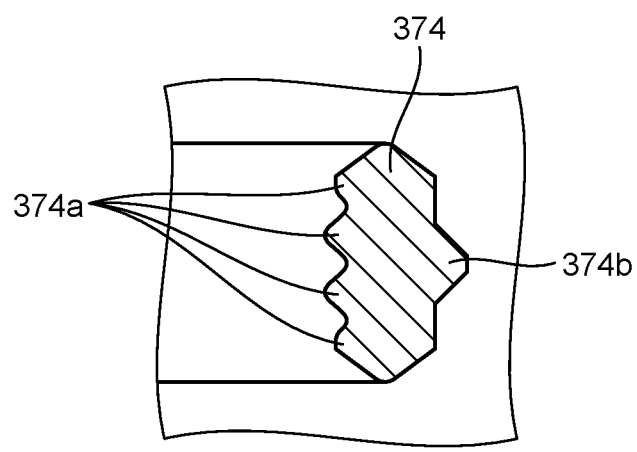
FIG. 13 is a longitudinal cross-sectional view of a seal member illustrated in FIG. 9 to FIG. 12.

As illustrated in FIG. 13 in an enlarged manner, each of the seal members 374 as described above has a plurality of (for example, four) endless projecting pieces 374a formed mutually separated along the circumferential direction on the inner circumferential surface thereof. A locking protrusion 374b projecting outward in the radial direction is formed on a part of the outer circumferential surface of the seal member 374.

Figure 14:
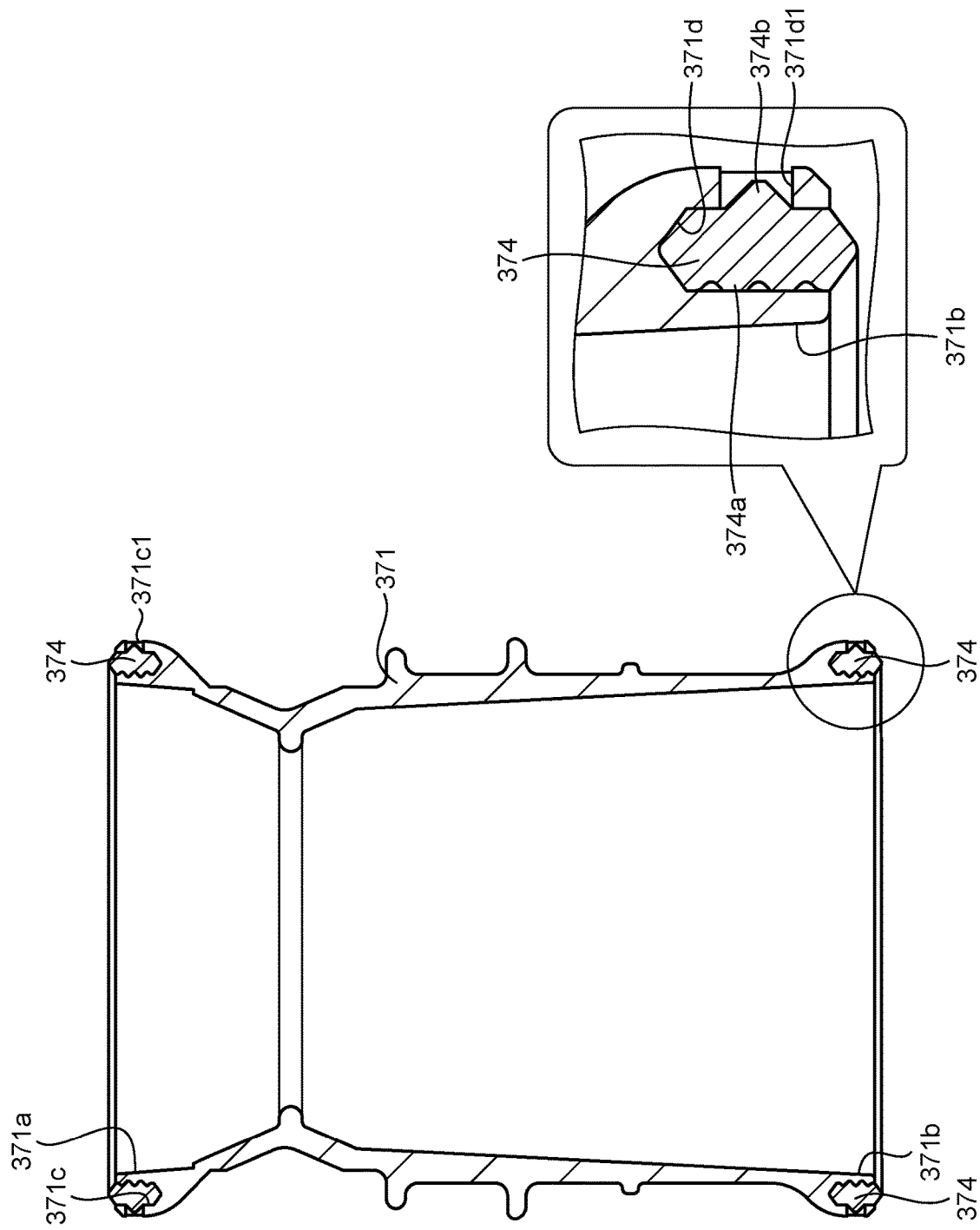
FIG. 14 is a longitudinal cross-sectional view of the cylinder illustrated in FIG. 2.

As illustrated also in FIG. 14, the seal members 374 are fitted into the mounting recess portions 371c and 371d to seal the opening edge portions by causing the projecting pieces 374a to abut against the inner surfaces of the mounting recess portions 371c and 371d while elastically deforming them and respectively inserting, from the inner side, the locking protrusions 374b into locking holes 371c1 and 371d1 formed in the mounting recess portions 371c and 371d.

The lid body 372 moves so as to approach or separate from the upper surface opening 371a of the cylinder 371 and opens and closes the upper surface opening 371a of the cylinder 371 when a driving mechanism 372a such as a motor drives in accordance with an instruction received from the controller 60. Although not illustrated clearly in the drawings, the lid body 372 has a hole allowing the ground coffee beans supplied through the powder chute 34 to be put into the cylinder 371 and a hole allowing the hot water supplied by the hot-water supply unit 35 to be put into the cylinder 371.

The filter block 373 is provided in an area under the cylinder 371 and is coupled to the above-mentioned beverage supply line 38. The filter block 373 moves in the up-down direction so as to approach or separate from the cylinder 371 when a motor 373a drives in accordance with an instruction received from the controller 60.

Figure 15:
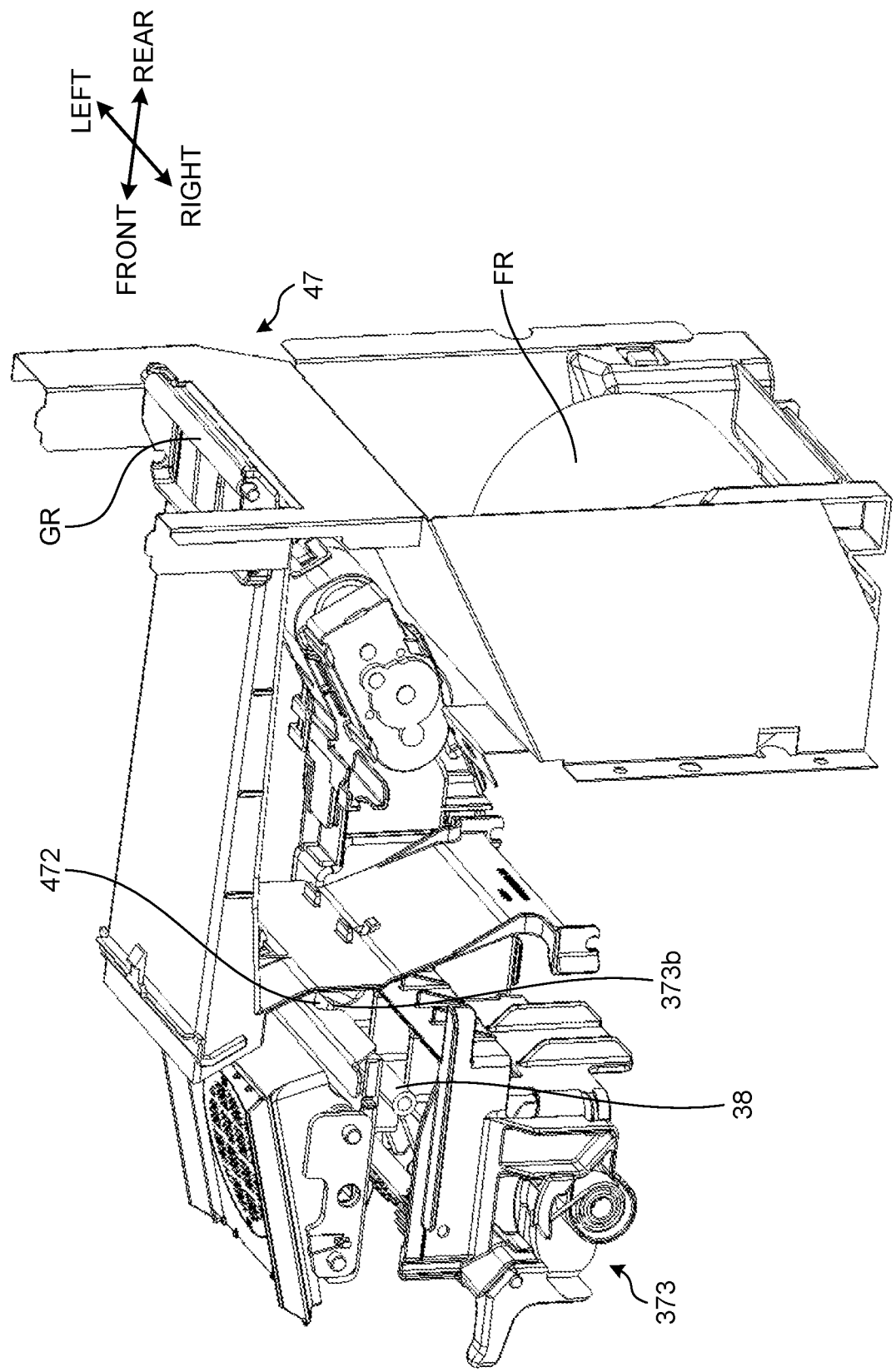
FIG. 15 is a perspective view illustrating a mounting configuration of a filter block illustrated in FIG. 2.
Figure 16:
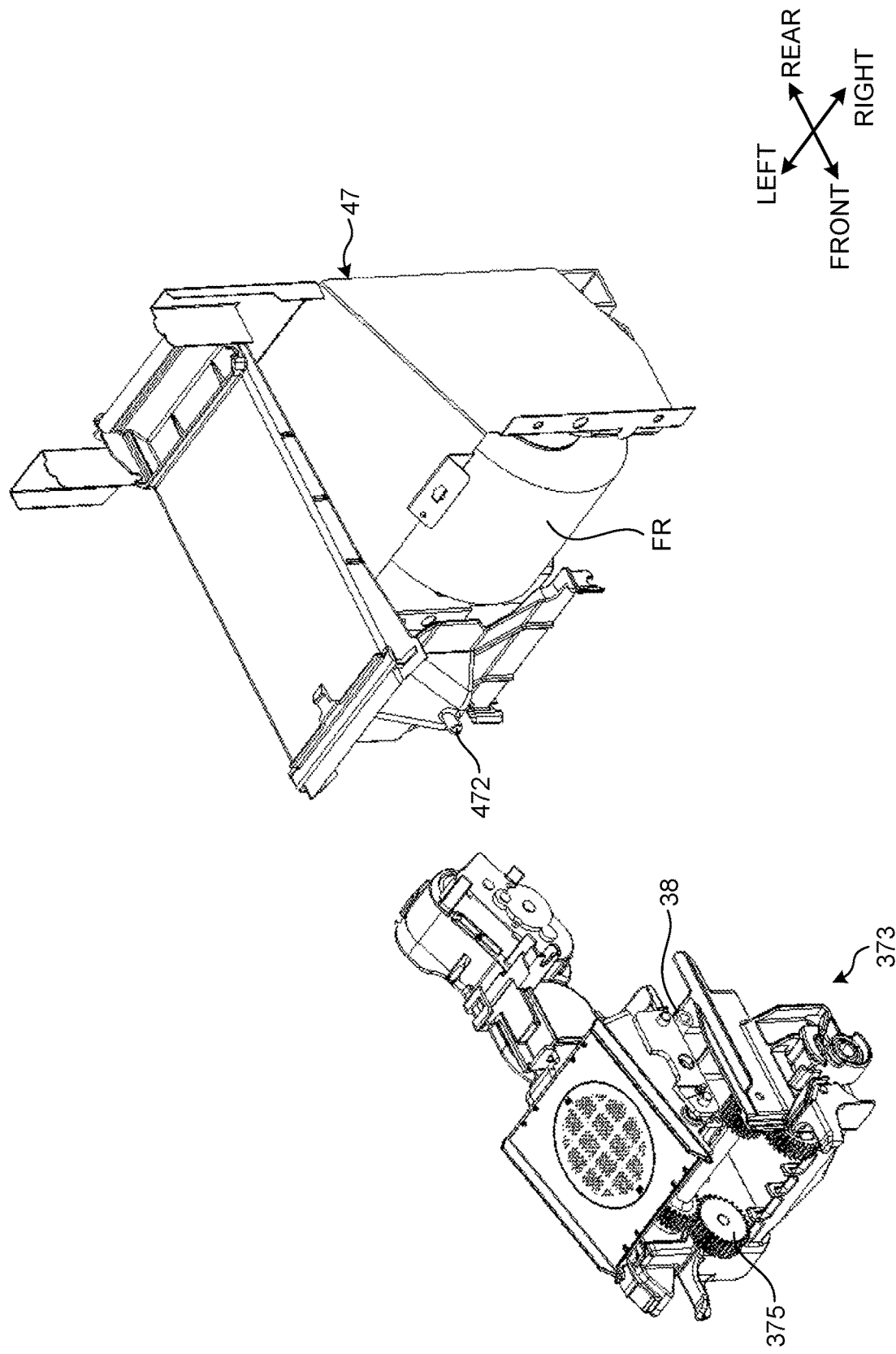
FIG. 16 is an exploded perspective view illustrating the filter block illustrated in FIG. 15 and the peripheral configuration thereof.

As illustrated in FIG. 15 and FIG. 16, the filter block 373 as described above is detachably mounted on a filter accommodation portion 47 mounted on the main body cabinet 10. That is to say, the filter block 373 is detachably mounted on the apparatus main body 1.

The filter accommodation portion 47 supports and accommodates therein a filter roll FR, in a rotatable manner, around which a paper filter PF is wound. The filter accommodation portion 47 includes a rotation detector 471. The rotation detector 471 is configured by, for example, an encoder and is a rotation detecting unit that detects rotation of the filter roll FR. The rotation detector 471 transmits a rotation signal to the controller 60 when it detects rotation of the filter roll FR.

Figure 17:
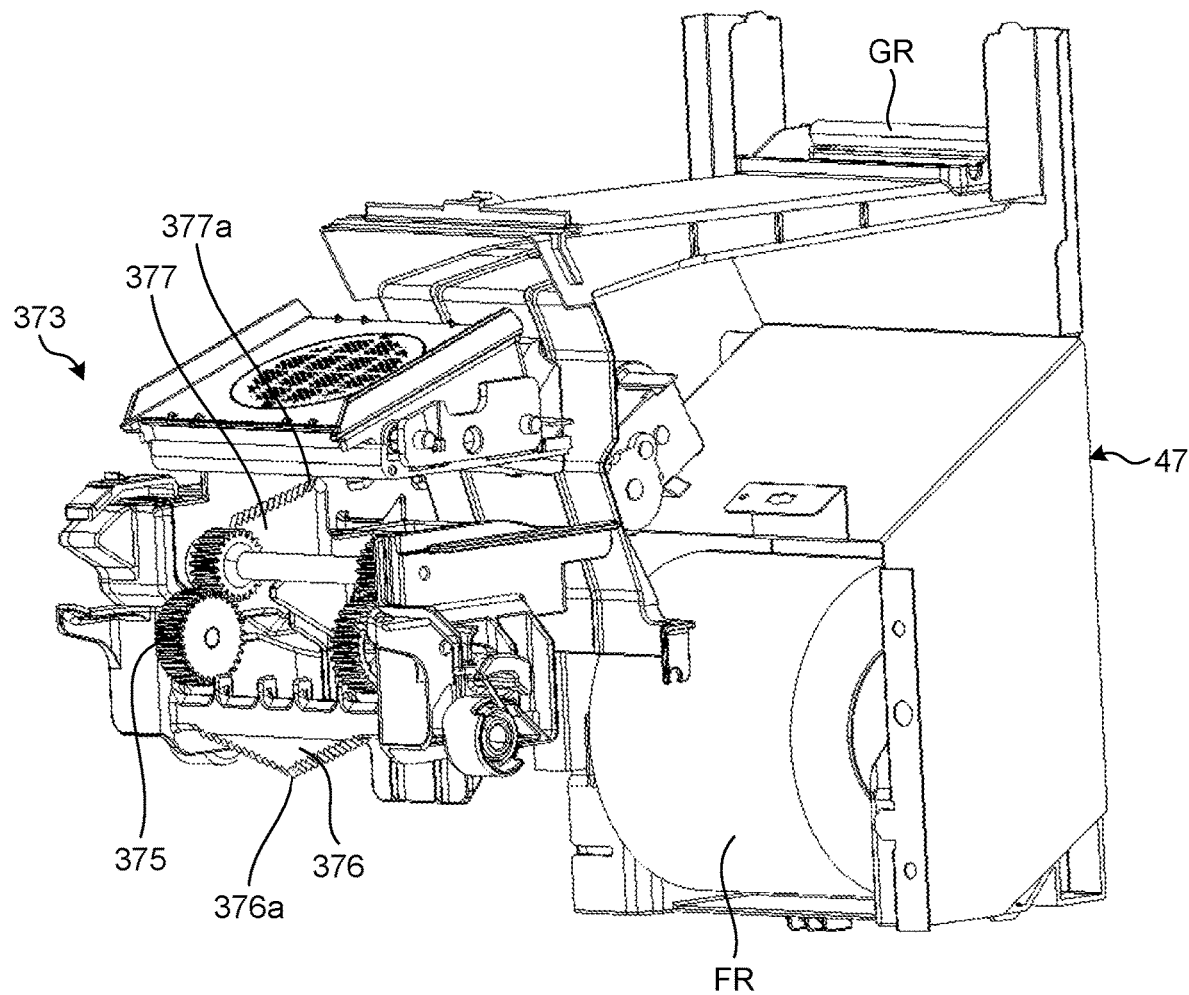
FIG. 17 is a perspective view illustrating the mounting configuration of the filter block illustrated in FIG. 2.

A groove portion 373b is formed in a rear end portion of the above-mentioned filter block 373, and a projection 472 formed on the filter accommodation portion 47 is inserted into the groove portion 373b, so that the filter block 373 is mounted on the apparatus main body 1. As illustrated in FIG. 17, the filter block 373 as described above includes a paper roller portion 375, a first cutter portion 376, and a second cutter portion 377.

The paper roller portion 375 holds therebetween the paper filter PF drawn out from the filter roll FR and guided by a guide roller GR. The paper roller portion 375 rotates when receiving an operation instruction from the controller 60.

The first cutter portion 376 is provided on the lower side of the paper roller portion 375 and cuts the paper filter PF. The first cutter portion 376 has a blade portion 376a for cutting the paper filter PF in a lower edge portion and extends along the vertical direction.

The second cutter portion 377 is provided on the rear side of the paper roller portion 375 and cuts the paper filter PF. The second cutter portion 377 has a blade portion 377a for cutting the paper filter PF in an upper edge portion.

Figure 18:
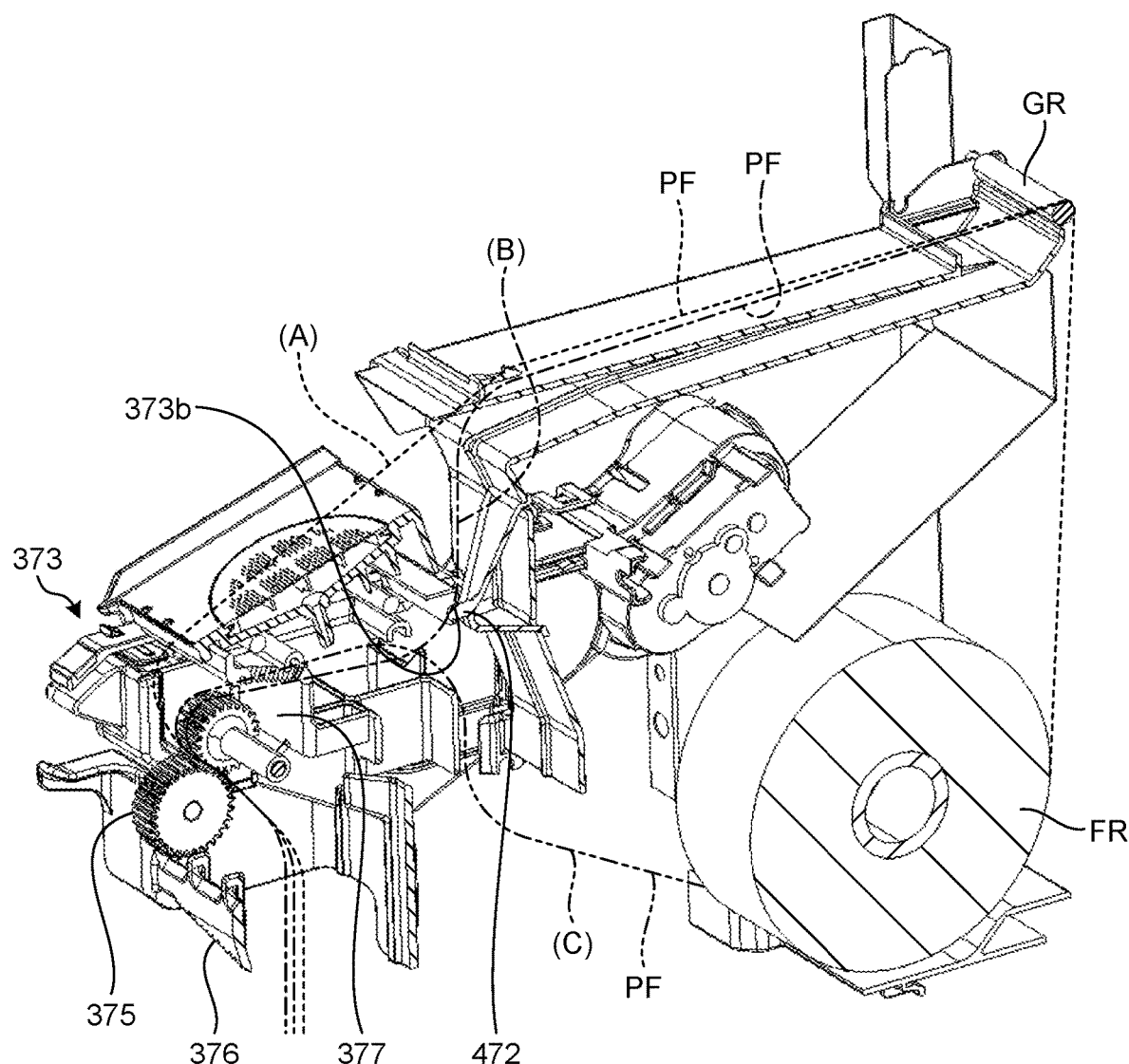
FIG. 18 is a cross-sectional view illustrating actions of the filter block illustrated in FIG. 2.

As illustrated in FIG. 18, the filter block 373 as described above feeds the paper filter PF from the filter roll FR by rotation of the paper roller portion 375 when the paper filter PF drawn out from the filter roll FR is set on a predetermined path so as to pass through between the cylinder 371 and the filter block 373 as indicated by dashed line (A). That is to say, the paper roller portion 375 allows a feeding operation of feeding the paper filter PF from the filter roll FR.

On the other hand, the following holds when the paper filter PF drawn out from the filter roll FR is not set on the predetermined path as indicated by dashed-dotted line (B) and chain double-dashed line (C). That is to say, when the paper filter PF is set as indicated by dashed-dotted line (B), as a result of restraint of displacement of the paper filter PF by the projection 472 that is inserted into the groove portion 373b, feeding of the paper filter PF from the filter roll FR is restrained even by rotation of the paper roller portion 375. When the paper filter PF is set as indicated by chain double-dashed line (C), the paper filter PF is cut by the second cutter portion 377 by rotation of the paper roller portion 375, and feeding of the paper filter PF from the filter roll FR is restrained.

That is to say, the filter block 373 is detachably mounted on the apparatus main body 1 and restrains feeding of the paper filter PF when the paper filter PF is not set on the predetermined path.

Figure 19:
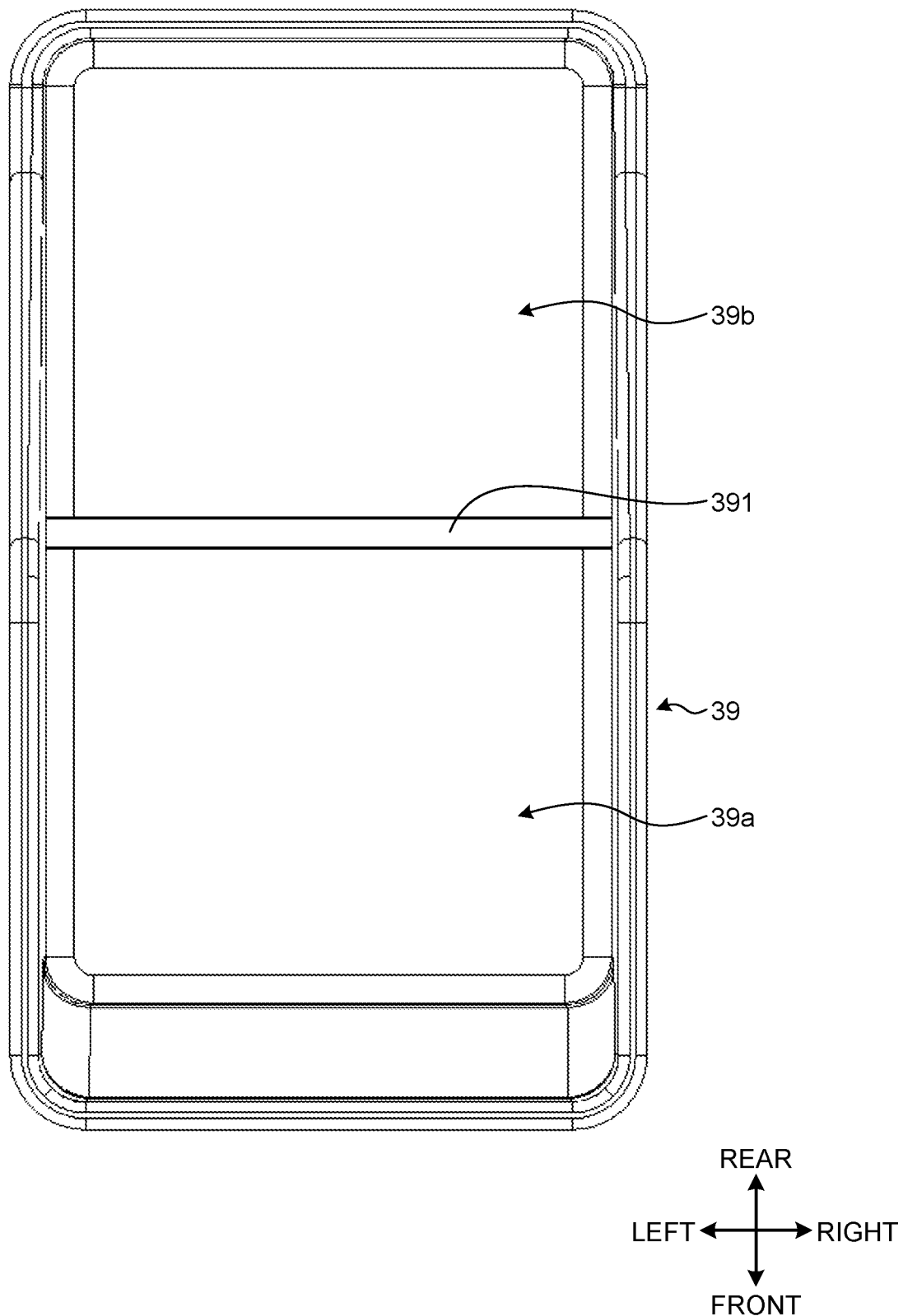
FIG. 19 is a plan view of an accommodation box illustrated in FIG. 2.

FIG. 19 is a plan view illustrating the accommodation box 39 illustrated in FIG. 2. The accommodation box 39 is installed in an area under the extractor 37 and accommodates therein extraction residue generated by extraction of the beverage by the extractor 37 together with the paper filter PF. The accommodation box 39 includes a partition member 391 and is partitioned into an area 39a for accommodating the extraction residue and an area 39b for accommodating the paper filter PF by the partition member 391.

The pressurized air supply line 41 is configured by coupling a plurality of pressurized air supply pipes, and one end thereof is coupled to the lid body 372 and the other end thereof is coupled to a halfway position of the beverage supply line 38. An air pump 411, a second pinch valve 412, and a third pinch valve 413 are provided on the pressurized air supply line 41.

The air pump 411 drives in accordance with an instruction received from the controller 60 and compresses and feeds the air. The second pinch valve 412 is provided on one end side (lid body 372 side) of the air pump 411. The second pinch valve 412 opens and closes in accordance with an instruction received from the controller 60. The second pinch valve 412 allows passage of the fluid in an open state and inhibits passage of the fluid in a closed state. The third pinch valve 413 is provided on the other end side (beverage supply line 38 side) of the air pump 411. The third pinch valve 413 opens and closes in accordance with an instruction received from the controller 60. The third pinch valve 413 allows passage of the fluid in an open state and inhibits passage of the fluid in a closed state.

The water discharge line 43 is configured by a single water discharge pipe or coupling a plurality of water discharge pipes and is provided so as to be branched from a halfway position of the beverage supply line 38. A fourth pinch valve 431 is provided on the water discharge line 43. The fourth pinch valve 431 opens and closes in accordance with an instruction received from the controller 60. The fourth pinch valve 431 allows passage of the fluid in an open state and inhibits passage of the fluid in a closed state.

Figure 20:
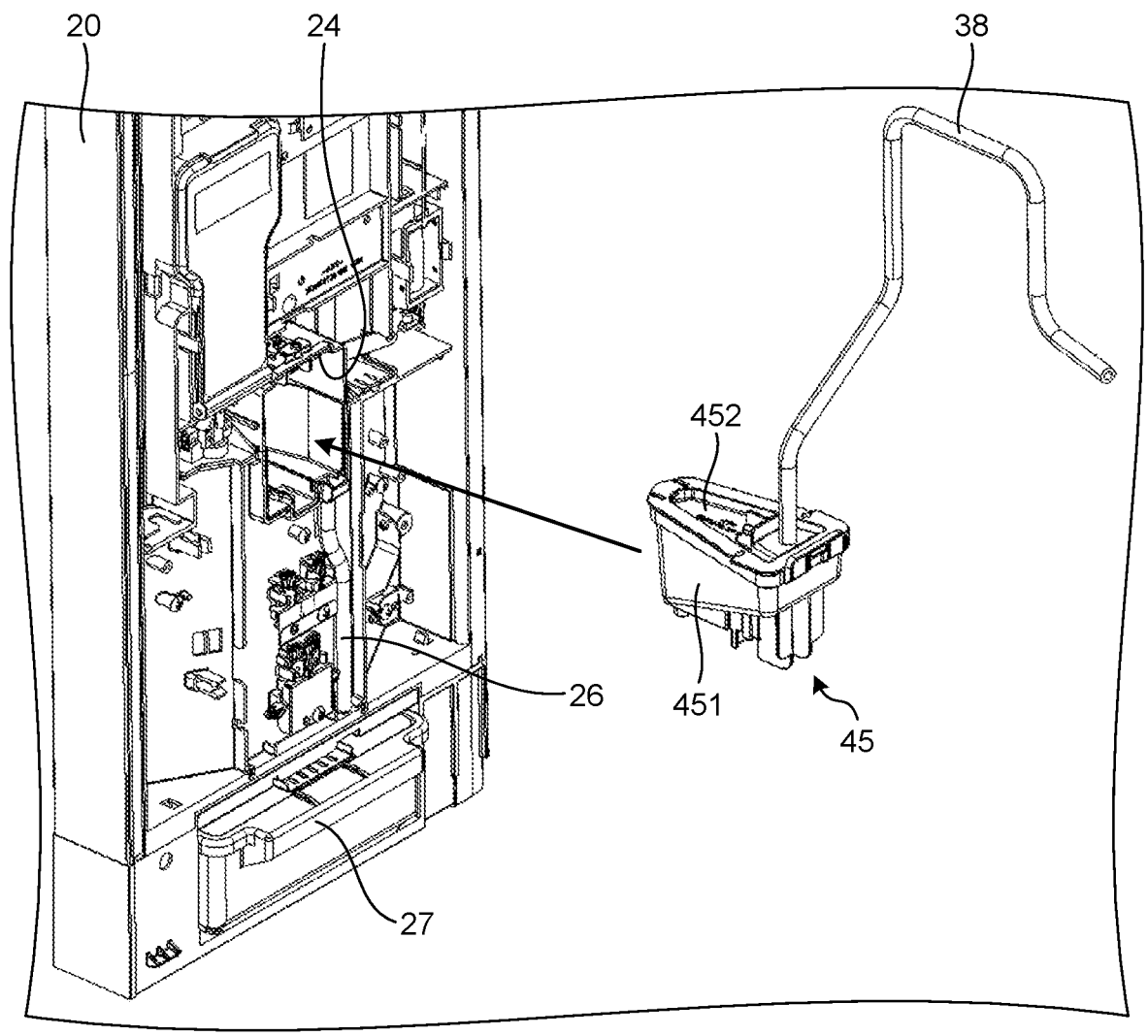
FIG. 20 is an exploded perspective view illustrating a mounting state of a nozzle illustrated in FIG. 2.
Figure 21:
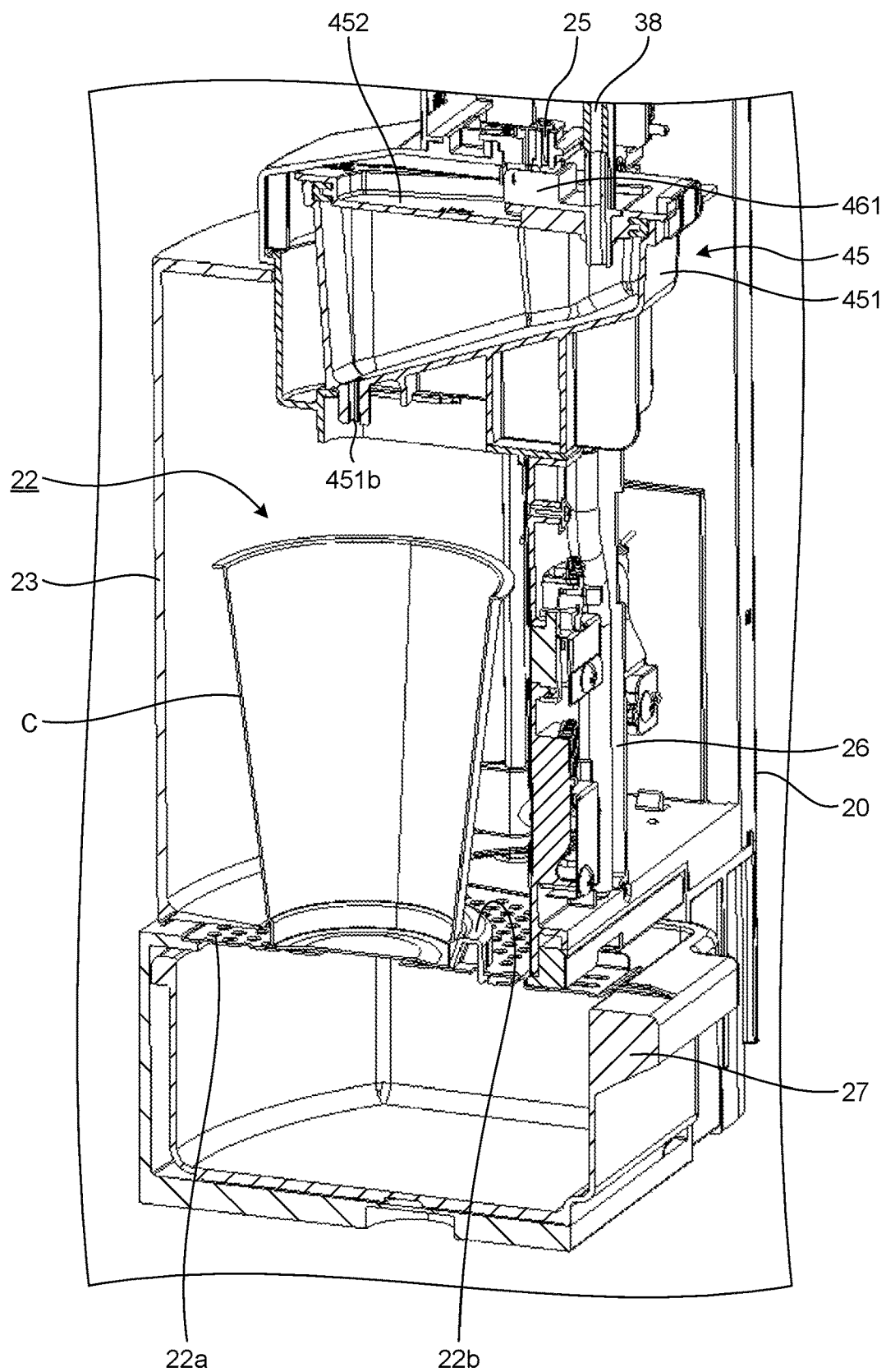
FIG. 21 is a perspective view illustrating the mounting state of the nozzle illustrated in FIG. 2 in a form of a cross section.

As illustrated in FIG. 20, the nozzle 45 is detachably mounted on a nozzle mounting portion 24 provided on the front door 20. The nozzle 45 is mounted on the nozzle mounting portion 24 and is thereby installed so as to face the beverage supply unit 22, as illustrated in FIG. 21. That is to say, the nozzle 45 is detachably installed so as to face the beverage supply unit 22. The nozzle 45 ejects the beverage supplied through the beverage supply line 38 into the container C placed on the stage 22a.

Figure 22:
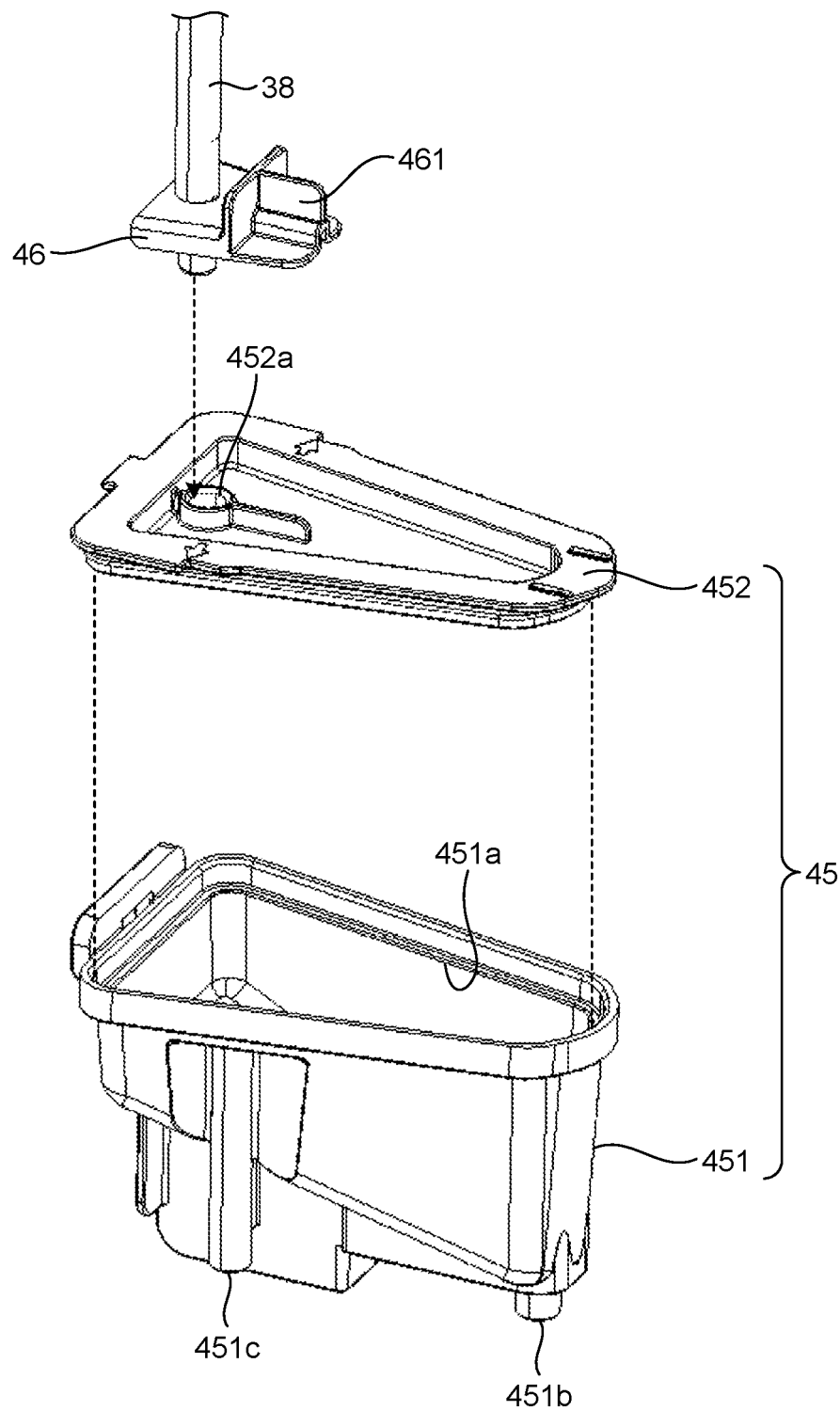
FIG. 22 is an exploded perspective view illustrating the configuration of the nozzle illustrated in FIG. 20 and FIG. 21.

As illustrated in FIG. 22, the nozzle 45 has the configuration in which a nozzle main body portion 451 has an opening 451a in an upper portion and the opening 451a is closed by a lid portion 452. The beverage supply line 38 is coupled to the nozzle 45 so as to communicate through a through-hole 452a formed in the lid portion 452. A joint member 46 is formed on an end portion of the beverage supply line 38, and a light shielding portion 461 is formed on the joint member 46.

A nozzle detector (detecting unit) 25 is provided on the nozzle mounting portion 24. The nozzle detector 25 is configured by a what-is-called optical sensor or the like. The nozzle detector 25 is turned ON and detects that the nozzle 45 in a state of being coupled to the beverage supply line 38 is mounted so as to face the beverage supply unit 22 only when the light shielding portion 461 of the joint member 46 on the beverage supply line 38 coupled to the nozzle 45 shields light emitted from a light emitter (not illustrated). The nozzle detector 25 transmits a detection result as a signal to the controller 60.

Figure 23:
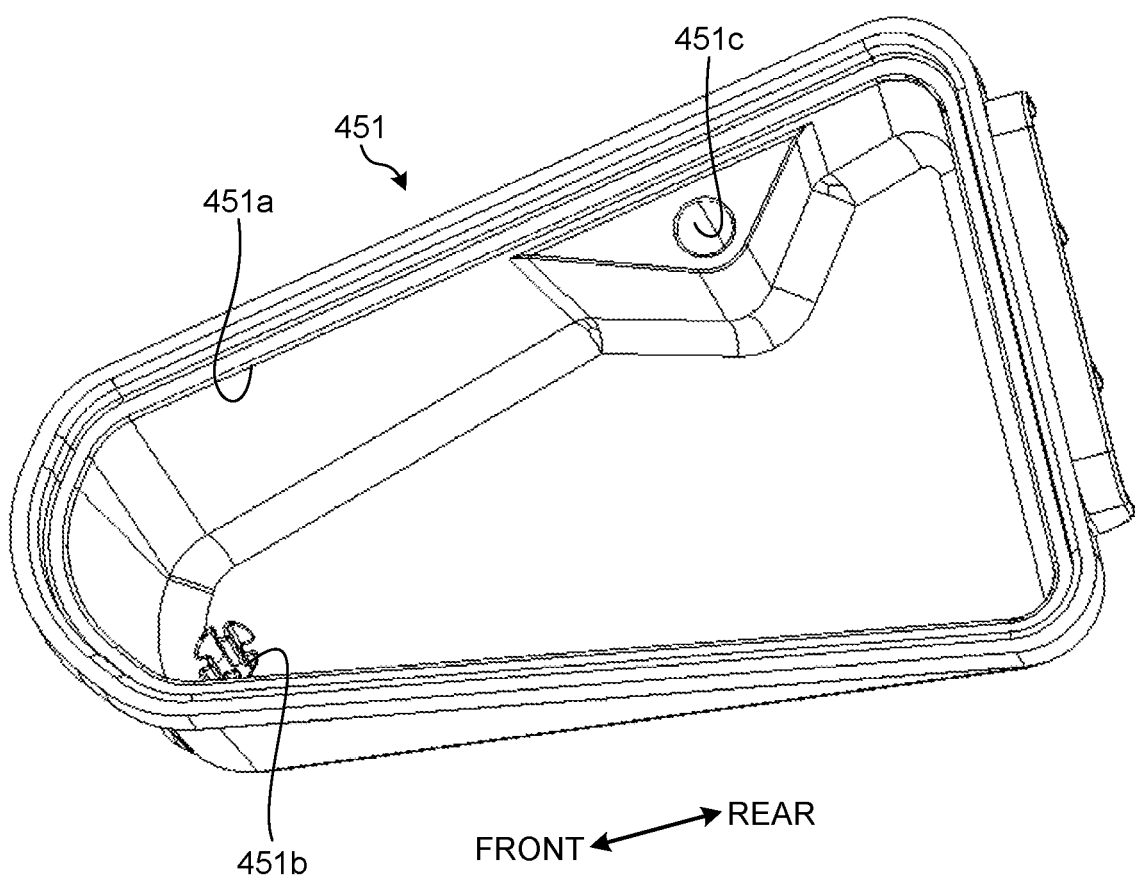
FIG. 23 is a perspective view illustrating a nozzle main body portion illustrated in FIG. 22.

As illustrated in FIG. 23, the above-mentioned nozzle main body portion 451 has an ejection port 451b for ejecting the beverage in a front portion and a discharge port 451c for discharging the air supplied together with the beverage in a rear portion separated from the ejection port 451b. As illustrated in FIG. 20 and FIG. 21, the discharge port 451c faces a discharge path 26 arranged on the back surface of the front door 20 outside the beverage supply unit 22 when the nozzle 45 is mounted so as to face the beverage supply unit 22. The discharge path 26 communicates with a water discharge tray 27 formed in an area under the beverage supply unit 22.

As illustrated in FIG. 3, a fan box 50 is provided in the main body cabinet 10 so as to be adjacent to the beverage making unit 30. The fan box 50 sucks vapor generated in the beverage making unit 30 with an action of an exhaust fan F arranged on a left bottom portion in the main body cabinet 10 and is installed on an upper end portion of an exhaust path 55 formed between the beverage making unit 30 and the left inner wall surface of the main body cabinet 10.

Figure 24:
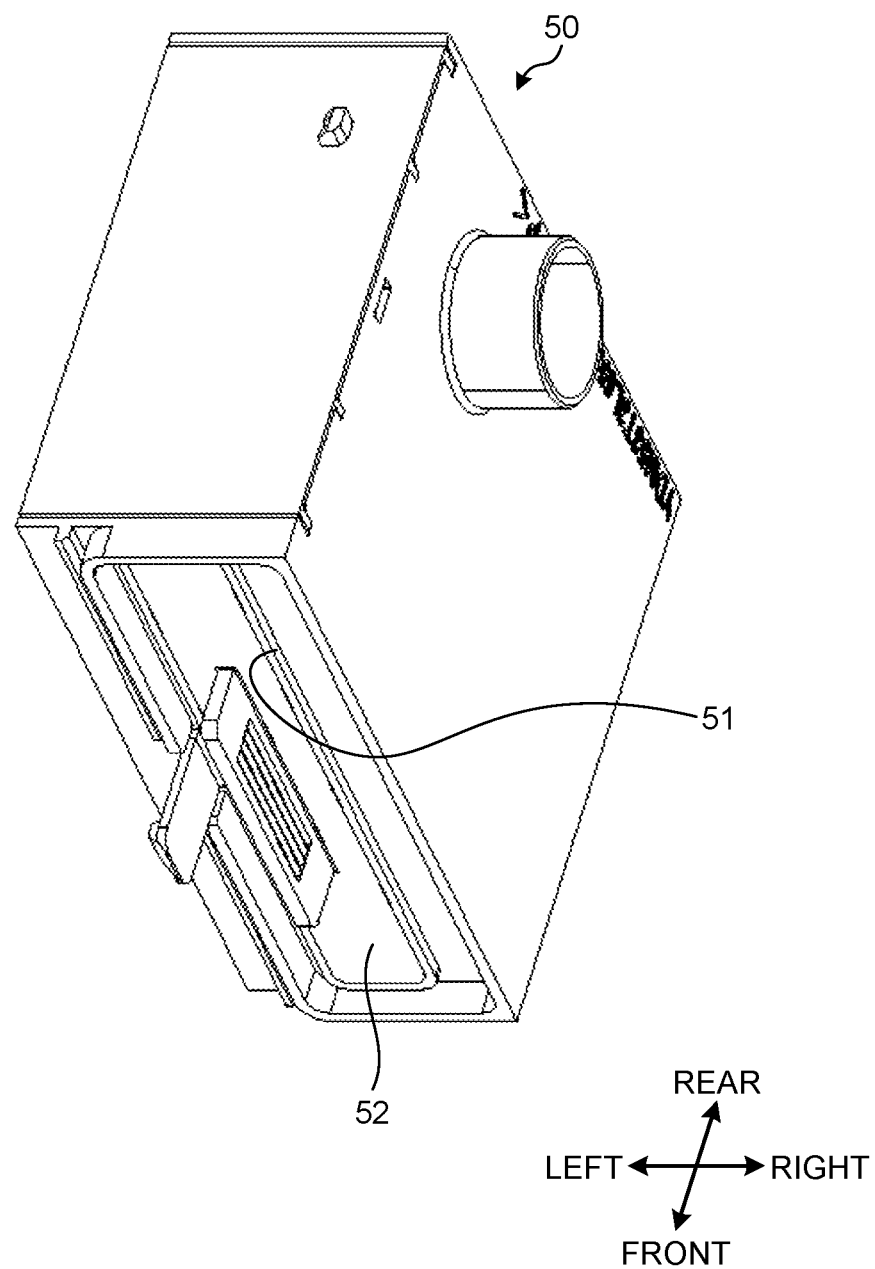
FIG. 24 is a perspective view illustrating the configuration of a fan box illustrated in FIG. 3.
Figure 25:
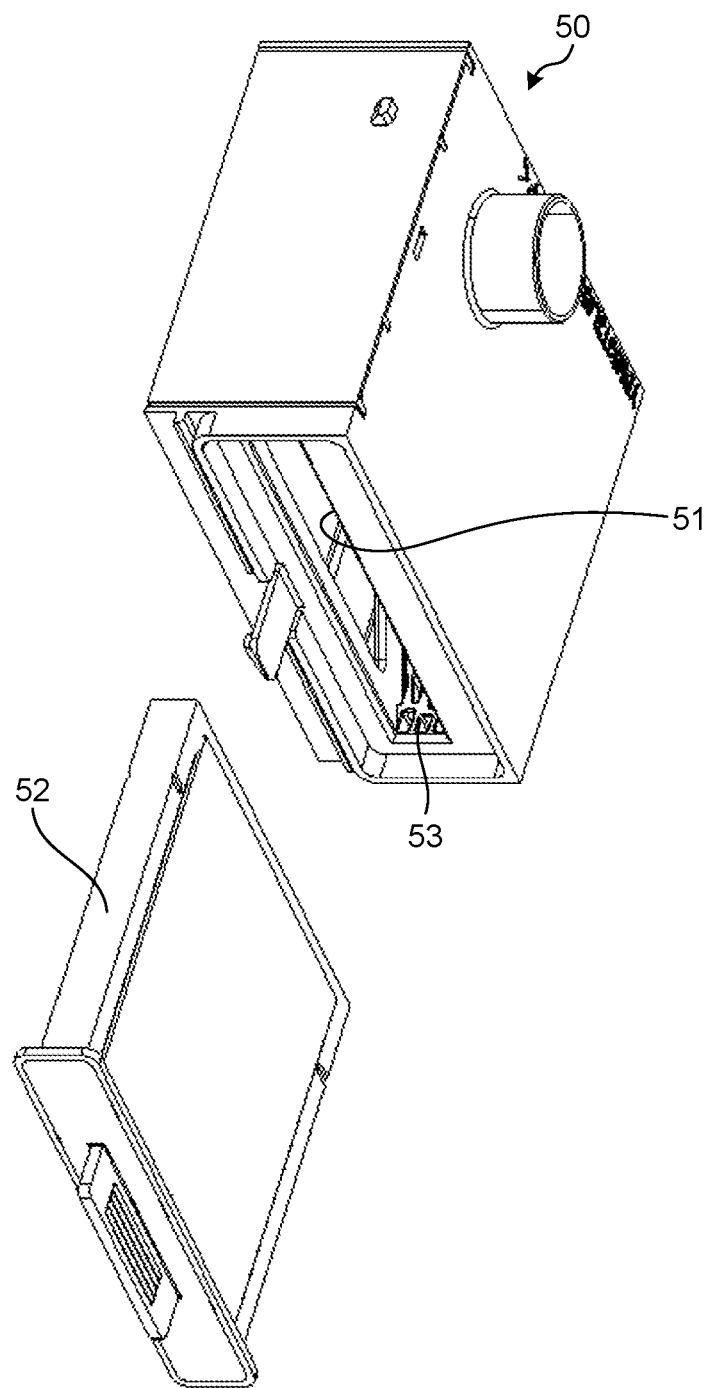
FIG. 25 is an exploded perspective view illustrating the configuration of the fan box illustrated in FIG. 24.

As illustrated in FIG. 24 and FIG. 25, the fan box 50 forms a box shape and has a filter opening 51 formed in the front surface thereof, and a fan filter 52 is removably attached to the fan box 50 so as to be inserted through the filter opening 51.

Figure 26:
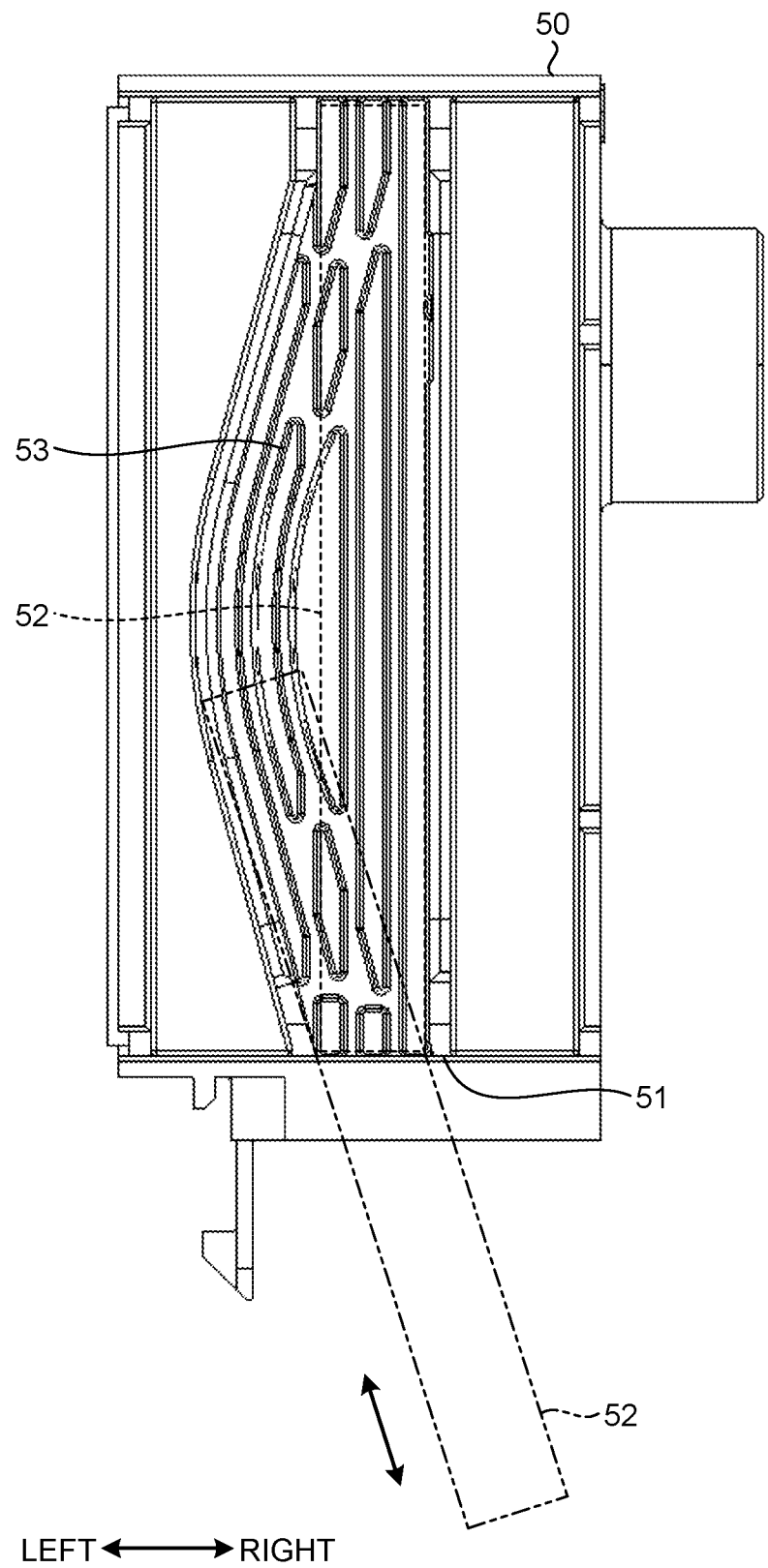
FIG. 26 is a plan view illustrating a rail portion of the fan box illustrated in FIG. 24 and FIG. 25.

As illustrated in FIG. 26, rail portions 53 are formed on the lower surface of an upper portion of the fan box 50 and the upper surface of a lower portion thereof. The rail portions 53 have partially curved sites so as to guide the fan filter 52 that is being inserted or removed in a posture inclined in the right-left direction.

The controller 60 comprehensively controls operations of the respective units of the beverage supply apparatus in accordance with a computer program and data stored in a storage unit (not illustrated). The controller 60 may be implemented by causing a processing device such as a central processing unit (CPU) to execute the computer program, that is, by software, may be implemented by hardware such as an integrated circuit (IC), or may be implemented by software and hardware in combination, for example.

The controller 60 has a sales controller 61 and a setting controller 62. The sales controller 61 controls making and supply of the beverage in the beverage making unit 30. The setting controller 62 determines whether the paper filter PF is normally set and executes paper filter determination processing, which will be described later.

In the beverage supply apparatus having the above-mentioned configuration, a coffee beverage can be supplied to the container C placed on the stage 22a of the beverage supply unit 22 in the following manner. It is assumed that the hot-water tank 351 stores therein generated hot water of a predetermined temperature, the first pinch valve 381, the second pinch valve 412, and the fourth pinch valve 431 are in the closed states, and the third pinch valve 413 is in the open state.

Figure 27:
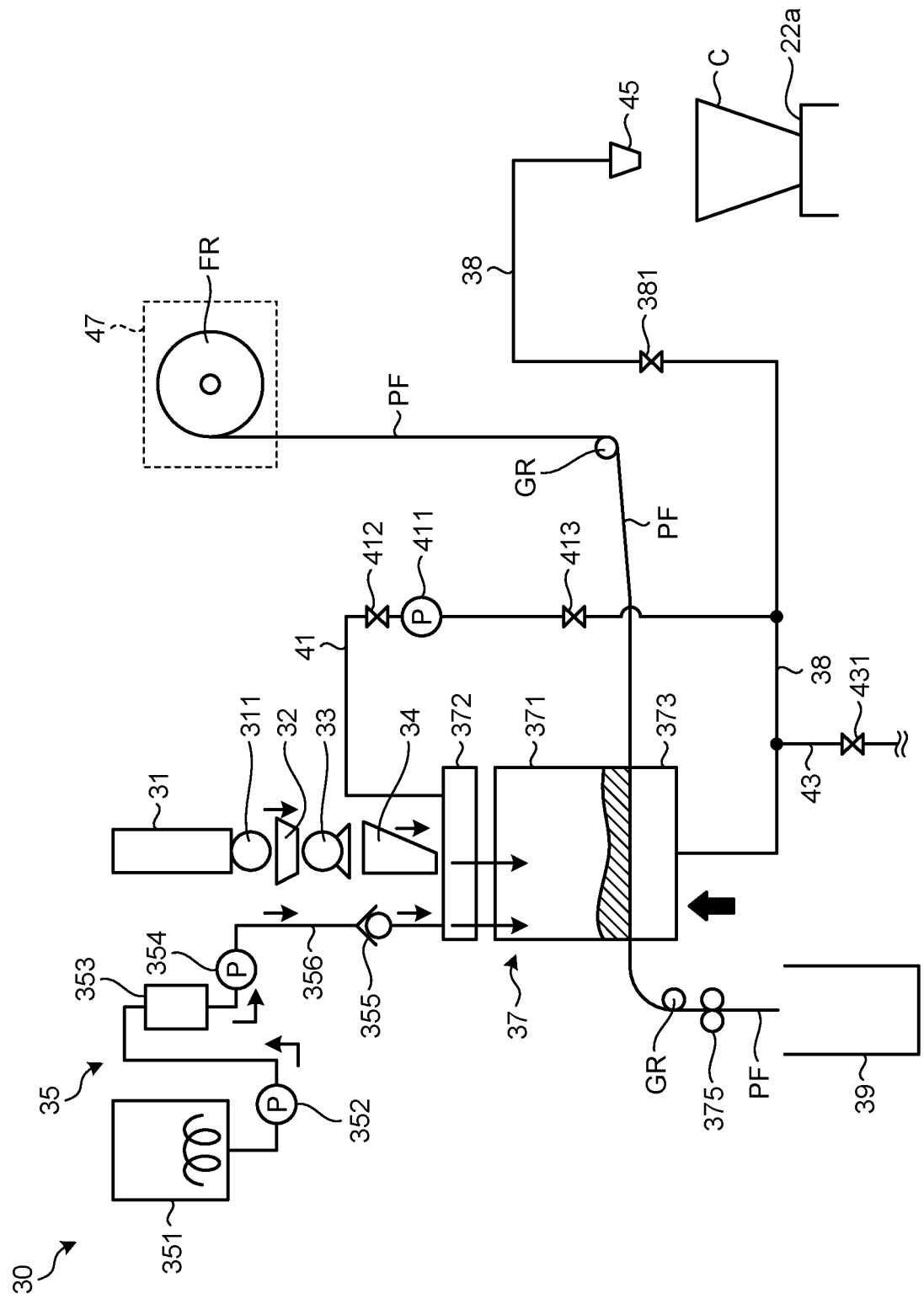
FIG. 27 is a schematic view illustrating procedures of supply of a beverage by a sales controller of a controller illustrated in FIG. 2.

When a user performs the touch operation on the display unit 21, the sales controller 61 of the controller 60 that has received the sales signal of a selected beverage moves the filter block 373 upward as illustrated in FIG. 27, and then, transmits the drive instruction to the ingredient supply driving unit 311 to dispense the coffee beans by an amount corresponding to the beverage to the grinder 33, and transmits the drive instruction to the grinder 33 to grind the coffee beans and put them into the extractor 37. Thereafter, driving of the ingredient supply driving unit 311 is stopped. The supply amount of the beverage selected by the user to the container C is assumed to be equal to or larger than the volume of the extractor 37 (cylinder 371).

The sales controller 61 drives the metering pump 352 to feed the fixed amount of the hot water to the auxiliary tank 353 from the hot-water tank 351 and drives the hot-water supply pump 354 to pressurize and feed the hot water in the auxiliary tank 353 to the extractor 37, thereby putting the hot water into the extractor 37. Then, driving of the metering pump 352 and the hot-water supply pump 354 is stopped.

Figure 28:
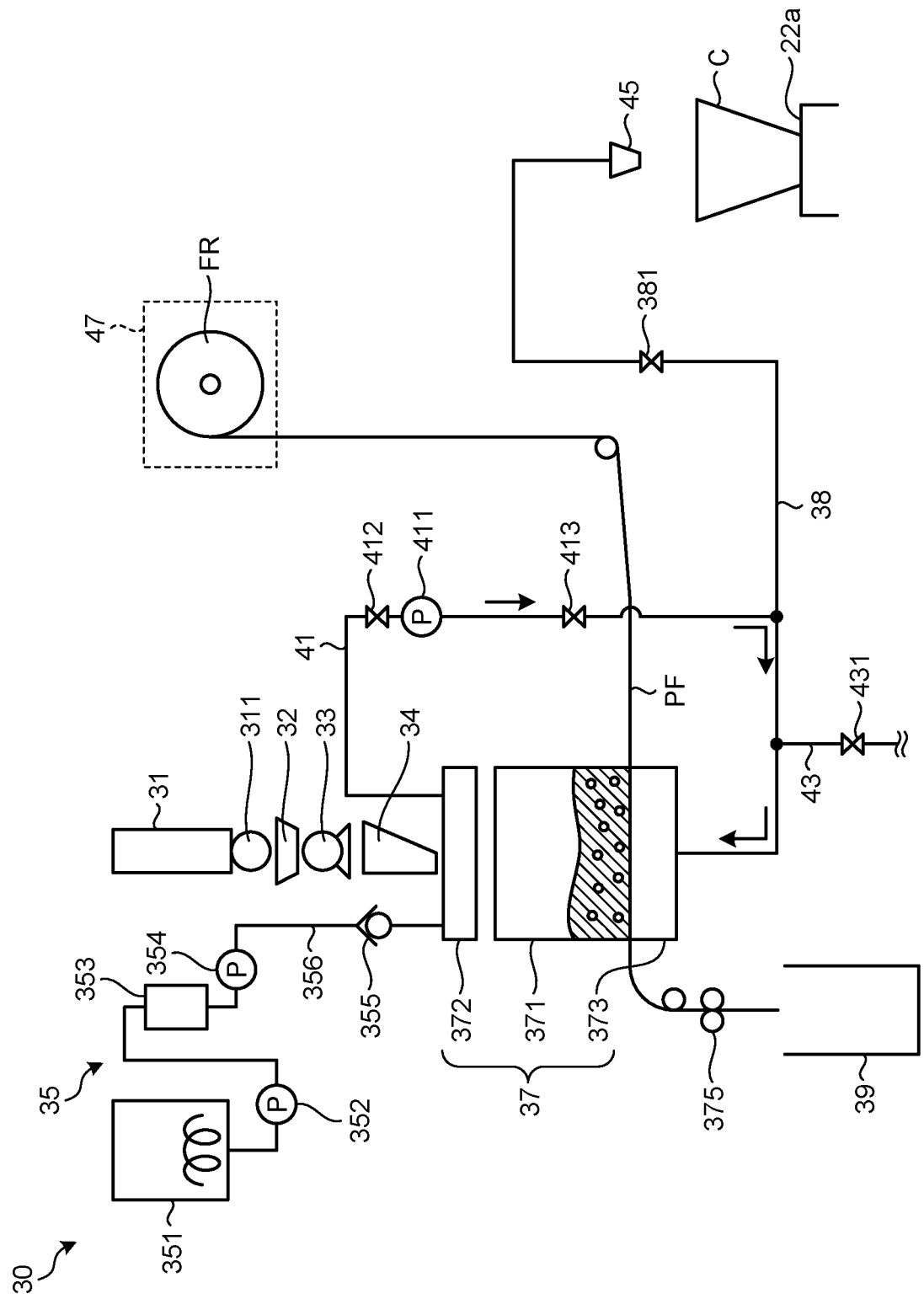
FIG. 28 is a schematic view illustrating the procedures of supply of the beverage by the sales controller of the controller illustrated in FIG. 2.

The sales controller 61 drives the air pump 411 to thereby supply the pressurized air (pressurized air for stirring) to the cylinder 371 using a part of the beverage supply line 38 to stir (forcibly stir) the ground coffee beans and the hot water, as illustrated in FIG. 28. After that, driving of the air pump 411 is stopped.

The sales controller 61 that has controlled to forcibly stir the ground coffee beans and the hot water in the above-mentioned manner moves the lid body 372 downward to close the upper surface opening 371a of the cylinder 371, makes the third pinch valve 413 into the closed state, makes the first pinch valve 381 and the second pinch valve 412 into the open states, and drives the air pump 411. The fourth pinch valve 431 is maintained in the closed state.

Figure 29:
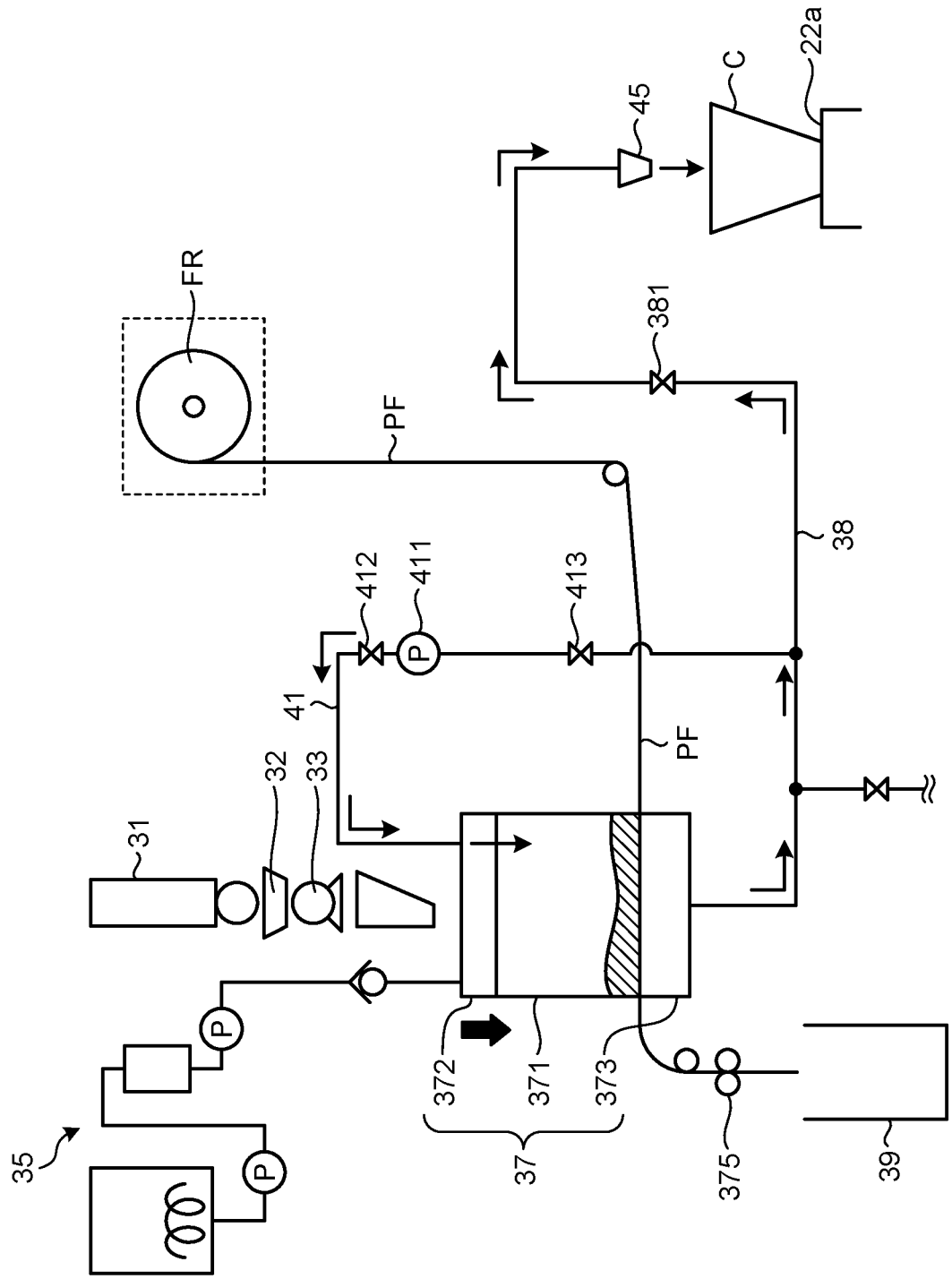
FIG. 29 is a schematic view illustrating the procedures of supply of the beverage by the sales controller of the controller illustrated in FIG. 2.

With this operation, as illustrated in FIG. 29, coffee is extracted by supplying the pressurized air (pressurized air for extraction) to the cylinder 371, and the extracted coffee is supplied to the nozzle 45 through the beverage supply line 38 and is ejected into the container C through the ejection port 451b of the nozzle 45.

The nozzle 45 has the discharge port 451c for discharging the pressurized air supplied together with the coffee through the beverage supply line 38 so as to be separated from the ejection port 451b and face the discharge path 26 provided outside the beverage supply unit 22, thereby discharging the pressurized air to the discharge path 26.

Figure 30:
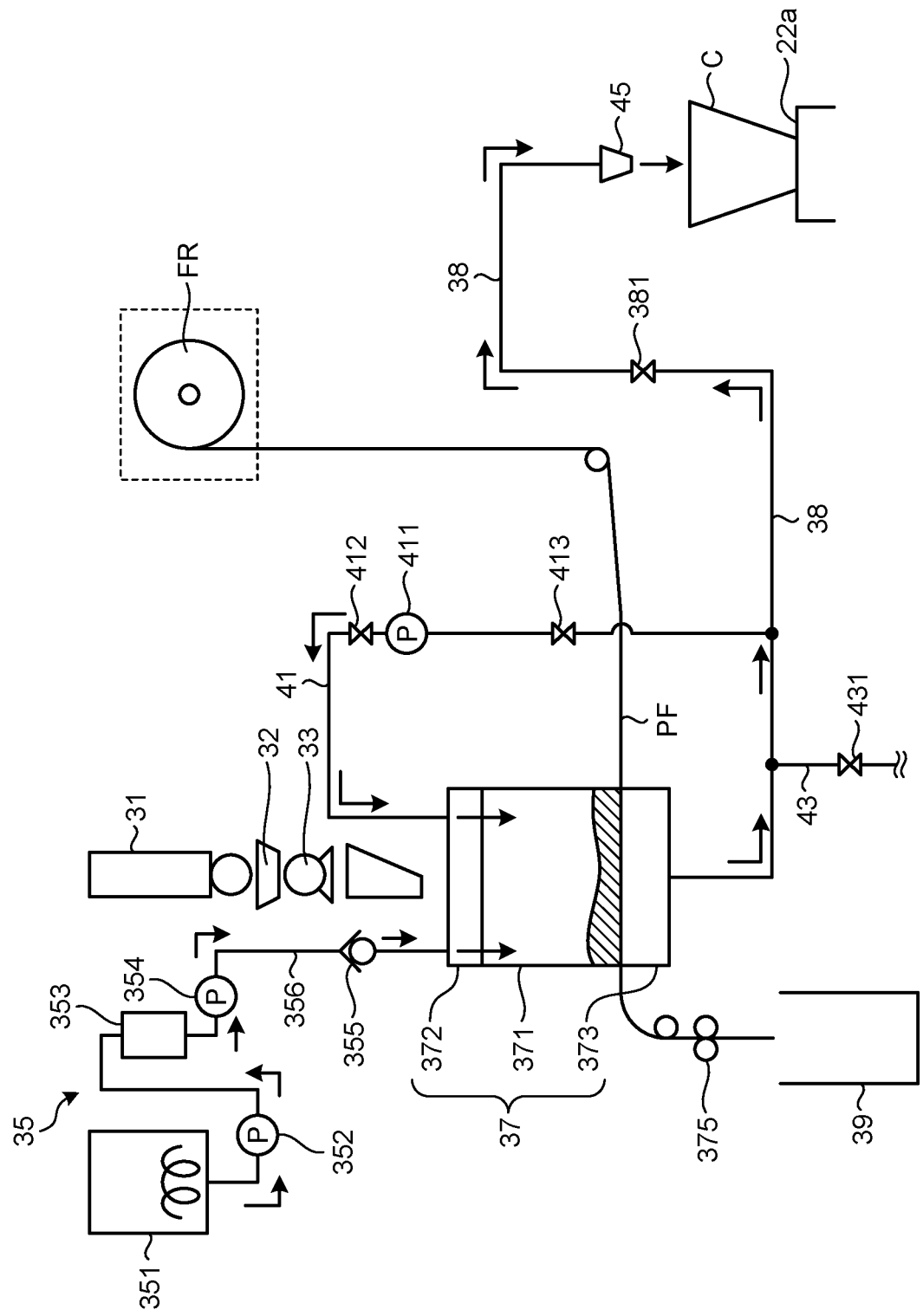
FIG. 30 is a schematic view illustrating the procedures of supply of the beverage by the sales controller of the controller illustrated in FIG. 2.

As described above, the supply amount of the beverage selected by the user to the container C is equal to or larger than the volume of the extractor 37 (cylinder 371). Accordingly, the sales controller 61 drives the metering pump 352 to feed the fixed amount of the hot water to the auxiliary tank 353 from the hot-water tank 351 and drives the hot-water supply pump 354 to pressurize and feed the hot water in the auxiliary tank 353 to the extractor 37 during ejection of the coffee to the container C from the nozzle 45, as illustrated in FIG. 30.

When the hot water temporarily stored in the auxiliary tank 353 is fed to the extractor 37 in the pressurized state, the coffee extracted using the hot water is ejected into the container C from the nozzle 45, and the predetermined amount of coffee is thereby supplied to the container C, the sales controller 61 stops driving of the metering pump 352, the hot-water supply pump 354, and the air pump 411. The user can thereby cause the opening/closing door 23 to swing in the opening direction and take the container C out of the beverage supply unit 22.

Figure 31:
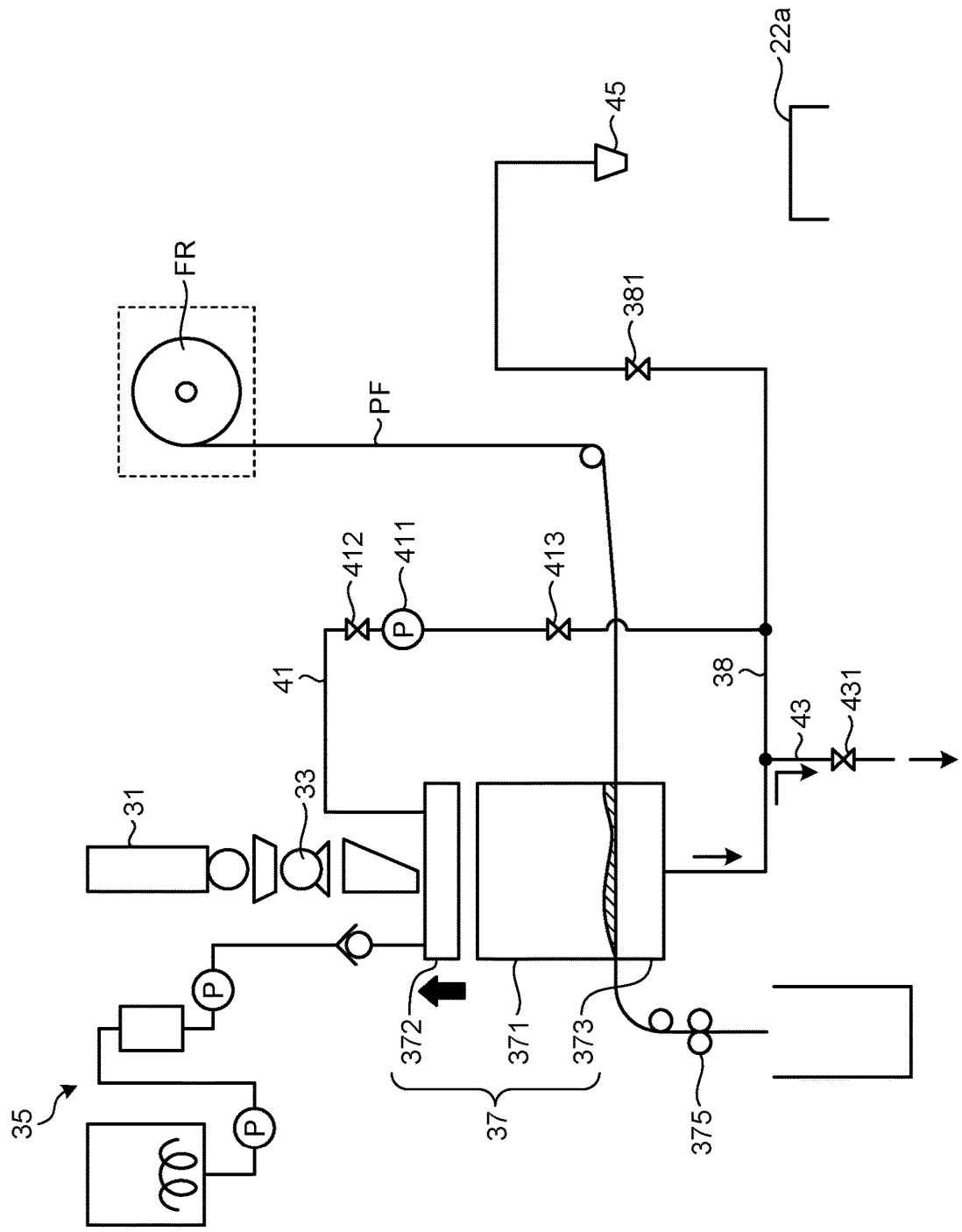
FIG. 31 is a schematic view illustrating the procedures of supply of the beverage by the sales controller of the controller illustrated in FIG. 2.

Thereafter, the sales controller 61 moves the lid body 372 upward and opens the upper surface opening 371a of the cylinder 371 to thereby release the inner pressure of the cylinder 371. Subsequently, the sales controller 61 controls the hot-water supply unit 35 to supply hot water to the extractor 37 to clean the inside of the cylinder 371, makes the fourth pinch valve 431 into the open state, and discharges water remaining in the extractor 37 through the water discharge line 43, as illustrated in FIG. 31.

Figure 32:
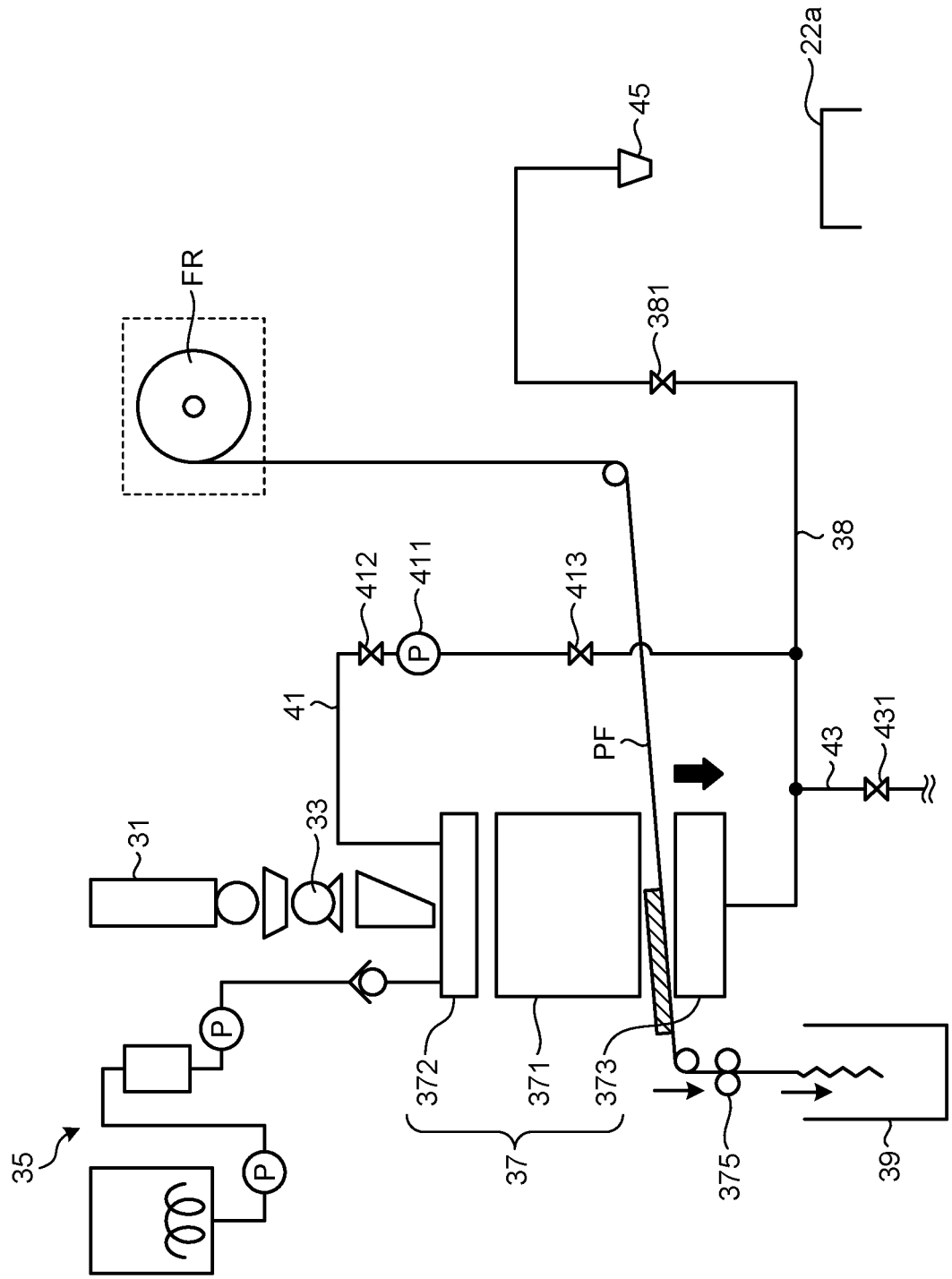
FIG. 32 is a schematic view illustrating the procedures of supply of the beverage by the sales controller of the controller illustrated in FIG. 2.

The sales controller 61 that has controlled to discharge water in such a manner makes the fourth pinch valve 431 into the closed state and moves the filter block 373 downward, as illustrated in FIG. 32. The sales controller 61 transmits the operation instruction to the paper roller portion 375 to feed the paper filter PF by a predetermined amount, controls to accommodate, in the accommodation box 39, the extraction residue generated by extraction of the coffee beverage together with the paper filter PF, and finishes supply of the coffee this time.

As described above, the controller 60 (sales controller 61) of the beverage supply apparatus controls the hot-water supply unit 35 to add the hot water to the extractor 37 during extraction of the coffee when the supply amount of the coffee to the container C is equal to or larger than the volume of the extractor 37 (cylinder 371).

In the above-mentioned beverage supply apparatus, a cleaning operation and a rinse operation of circulating only hot water through the beverage making unit 30 are periodically performed. When the sales signal is received after the cleaning operation or when the rinse operation is performed, the setting controller 62 of the controller 60 executes the following paper filter determination processing before supply of the beverage or the rinse operation mentioned above.

FIG. 33 is a flowchart illustrating processing contents of the paper filter determination processing that the setting controller 62 illustrated in FIG. 2 executes.

In the paper filter determination processing, the setting controller 62 transmits the operation instruction to the paper roller portion 375 (step S101) and waits for input of the rotation signal from the rotation detector 471 (step S102).

As described above, the filter block 373 is detachably mounted on the apparatus main body 1 and restrains feeding of the paper filter PF when the paper filter PF is not set on the predetermined path.

When the rotation signal is input from the rotation detector 471 (Yes at step S102), the setting controller 62 determines that the paper filter PF is normally set (step S103) and transmits an operation stop instruction to the paper roller portion 375 (step S104). Then, the setting controller 62 returns the procedures and finishes the current processing.

On the other hand, when no rotation signal is input from the rotation detector 471 even after predetermined time has elapsed (No at step S102), the setting controller 62 regards that the filter roll FR does not rotate due to restraint of feeding of the paper filter PF and determines that the paper filter PF is abnormally set (step S105). The setting controller 62 transmits a display instruction for displaying occurrence of abnormality on the display unit 21 (step S106). The setting controller 62 transmits an operation stop instruction to the paper roller portion 375 (step S107), and then, returns the procedures and finishes the current processing.

As described above, the beverage supply apparatus as the embodiment of the present disclosure provides the following action effects.

The nozzle detector 25 detects that the nozzle 45 in the state of being coupled to the beverage supply line 38 is mounted so as to face the beverage supply unit 22. The nozzle 45 is therefore prevented from being mounted so as to face the beverage supply unit 22 while coupling between the nozzle 45 and the beverage supply line 38 is insufficient, thereby preventing leakage of coffee (beverage) due to coupling between the nozzle 45 and the beverage supply line 38 from occurring.

The discharge port 451c of the nozzle 45 is provided so as to be separated from the ejection port 451b and face the discharge path 26 provided outside the beverage supply unit 22, thereby discharging the pressurized air supplied together with the coffee to the discharge path 26 and preventing them from being ejected to the container C. The risk of mixture of foreign matters in the container C can therefore be reduced.

The rail portions 53 formed in the fan box 50 guide the fan filter 52 that is being inserted or removed in the posture inclined in the right-left direction. The fan filter 52 can therefore be easily inserted into and removed from the fan box 50 regardless of presence of a device installed in a front area of the fan box 50.

The accommodation box 39 is partitioned into the area 39a for accommodating the extraction residue and the area 39b for accommodating the paper filter PF by the partition member 391, thereby easily separating the extraction residue and the paper filter PF.

The plate spring 323 interposed between the ingredient chute 32 and the grinder 33 biases the ingredient chute 32 such that the ingredient chute 32 separates from the grinder 33 and approaches the ingredient box 31. The ingredient chute 32 can therefore be pressed against the ingredient box 31 even when variations in the installation height of the ingredient box 31 and the installation height of the grinder 33 are generated, thereby preferably coupling the ingredient box 31 and the grinder 33.

The gutters 312 provided integrally with the ingredient box 31 receive the liquid entering through the spaces 13 in the top plate portion 12 of the main body cabinet 10 and guide the liquid to the area outside the beverage making unit 30, thereby preventing the liquid from dripping into the beverage making unit 30.

The controller 60 (sales controller 61) controls the hot-water supply unit 35 to add the hot water to the extractor 37 during extraction of the coffee when the supply amount of the coffee to the container C is equal to or larger than the volume of the extractor (cylinder 371). The coffee supply time can therefore be shortened in comparison with the technique in the related art in which the hot water is supplied again for stirring.

The cylinder 371 included in the extractor 37 has the opening edge portions of the upper surface opening 371a and the lower surface opening 371b that are sealed by the seal members 374. The cleaning operation of the extractor 37 can therefore be made easy without requiring detachment of the seal member from the lid body unlike the technique in the related art.

The seal members 374 can be kept in the state of being fitted into the mounting recess portions 371c and 371d even when a pressure in the cylinder 371 is increased in coffee extraction and the like because the projecting pieces 374a are made to abut against the inner surfaces of the mounting recess portions 371c and 371d while being elastically deformed, thereby achieving excellent pressure resistance. The seal members 374 are fitted into the mounting recess portions 371c and 371d by insertion of the locking projections 374b into the locking holes 371c1 and 371d1. The seal members 374 can therefore be easily detached from the mounting recess portions 371c and 371d by disengaging the locking projections 374b from the locking holes 371c1 and 371d1.

In the hot-water supply unit 35, the metering pump 352 feeds the fixed amount of the hot water to the auxiliary tank 353 from the hot-water tank 351, the hot-water supply pump 354 pressurizes and feeds the hot water in the auxiliary tank 353 to the extractor 37. The predetermined amount of the hot water even in the pressurized state can therefore be preferably supplied to the extractor 37.

The filter block 373 is detachably mounted on the apparatus main body 1 and restrains feeding of the paper filter PF when the paper filter PF is not set on the predetermined path. The controller 60 controls the paper roller portion 375 to feed the paper filter PF at predetermined timing and determines that the paper filter PF is normally set when the rotation detector 471 detects rotation of the filter roll FR whereas determines that the paper filter PF is abnormally set when the rotation detector 471 does not detect rotation of the filter roll FR. Setting of the paper filter PF can therefore be preferably determined.

The first cutter portion 376 included in the filter block 373 extends along the vertical direction, thereby preventing deposition of the ground coffee beans and the like on the first cutter portion 376.

Although the preferred embodiment of the present disclosure has been described above, the present disclosure is not limited thereto and various modifications can be made.

In the above-mentioned embodiment, the nozzle detector 25 is made into the ON state only when the light shielding portion 461 of the joint member 46 shields light emitted from the light emitter and detects that the nozzle 45 in the state of being coupled to the beverage supply line 38 is mounted so as to face the beverage supply unit 22. In the present disclosure, the light shielding portion may however be provided on the nozzle. In this case, the following configuration may be employed. That is, an end portion of the beverage supply line on which the joint member is provided is coupled to the nozzle mounting portion all the time. When the nozzle is mounted on the nozzle mounting portion, the joint member is engaged with the nozzle, and the light shielding portion of the nozzle shields light to the detecting unit. In other words, in the present disclosure, as long as the detecting unit can detect that the nozzle in the state of being coupled to the beverage supply line is mounted so as to face the beverage supply unit, a detecting mode thereof is not particularly limited.

In the above-mentioned embodiment, the accommodation box 39 is partitioned into the area 39a for accommodating the extraction residue and the area 39b for accommodating the paper filter PF by the partition member 391. In the present disclosure, a partitioning mode is however not particularly limited, and the accommodation box 39 may be partitioned into the area for accommodating the extraction residue and the area for accommodating the paper filter by installing a small-sized box for accommodating the paper filter in the accommodation box.

In the above-mentioned embodiment, the gutters 312 are provided integrally with the ingredient box 31. In the present disclosure, the installation place of the gutter members is however not particularly limited, and the gutters may be provided in a manner of being hung on the top plate portion of the main body cabinet, for example.

In the above-mentioned embodiment, only supply of the hot water to the extractor 37 by the hot-water supply unit 35 is described. The present disclosure may however employ the following. That is to say, the supply rate of the hot water to the extractor by the hot-water supply unit may be changed in accordance with a type of the beverage to be supplied. Accordingly, the degree of stirring of the ingredient and the hot water can be changed, so that a taste of the extracted beverage can be adjusted. In the present disclosure, the hot-water supply unit may swirl and supply the hot water in such a manner that the hot water contacts the inner wall surface of the cylinder. The hot water and the entire ingredient put into the extractor can thereby be stirred.

In the above-mentioned embodiment, only supply of the pressurized air to the extractor 37 is described. In the present disclosure, the pressure of the pressurized air for stirring that is supplied to the extractor may be changed by changing compression force by the air pump. Accordingly, the degree of stirring of the ingredient and the hot water can be changed, so that the taste of the extracted beverage can be adjusted.

In the above-mentioned embodiment, the metering pump 352 feeds the fixed amount of the hot water to the auxiliary tank 353 from the hot-water tank 351. In the present disclosure, a feeding unit is not limited to the metering pump and may be configured by a valve or the like. That is to say, the fixed amount of the hot water may be fed to the auxiliary tank by making the valve in an open state for predetermined time continuously.

In the above-mentioned embodiment, a material of the filter block 373 is not particularly described. In the present disclosure, the filter block may be made of a resin material produced by appropriately blending an antibacterial material. This can prevent propagation of sundry bacteria.

In the above-mentioned embodiment, in the paper filter determination processing, when it is determined that the paper filter PF is abnormally set, the display unit 21 displays occurrence of the abnormality. In the present disclosure, when it is determined that the paper filter PF is abnormally set, a notification unit may output an alarm such as a buzzer sound to urge an operator such as a worker of a store to reset the paper filter.

Although not particularly described in the above-mentioned embodiment, in the present disclosure, the filter roll may be capable of being refilled into the filter accommodation portion from the front side or the rear side.

According to the present disclosure, the control unit controls the hot-water supply unit to add the hot water to the extractor during extraction of the beverage when the supply amount of the beverage to the container is equal to or larger than the volume of the extractor. The present disclosure therefor provides an effect that beverage supply time can be shortened in comparison with the technique in the related art in which the hot water is supplied again for stirring.

According to the present disclosure, in the hot-water supply unit, the first feeding unit feeds the fixed amount of the hot water to the auxiliary tank from the hot-water tank, and the second feeding unit pressurizes and feeds the hot water in the auxiliary tank to the extractor. That is to say, the fixed amount of the hot water temporarily stored in the auxiliary tank is supplied. The present disclosure therefore provides an effect that the predetermined amount of the hot water even in a pressurized state can be preferably supplied to the extractor. The feeding amount by the second feeding unit is larger than the feeding amount by the first feeding unit, thereby providing an effect that overflow of the hot water from the auxiliary tank can be prevented.

According to the present disclosure, the cylinder included in the extractor and having the substantially cylindrical shape is formed by sealing the opening edge portions of the upper opening and the lower opening by the seal members. The present disclosure therefore provides an effect that a cleaning operation of the extractor can be made easy without requiring detachment of the seal members from a lid body unlike the technique in the related art.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A beverage supply apparatus comprising:
   a grinder configured to grind an ingredient;
   a hot-water supply unit configured to supply hot water;
   an extractor configured to extract a beverage made from a ground ingredient which is the ingredient ground by the grinder, and the hot water supplied by the hot-water supply unit;
   an air pump configured to supply a pressurized air to the extractor; and
   a control unit including a central processing unit to execute a computer program and configured to give instructions to the grinder, the hot-water supply unit, the extractor, and the air pump,
   wherein
   the hot-water supply unit includes:
      a first pump that feeds a fixed amount of the hot water to an auxiliary tank from a hot-water tank storing the hot water, and
      a second pump that pressurizes and feeds the hot water in the auxiliary tank to the extractor, and
   the instructions include:
      grinding the ingredient by the grinder and feed the ground ingredient to the extractor,
      supplying the hot water from the hot-water tank to the auxiliary tank by the first pump and from the auxiliary tank to the extractor by the second pump,
      supplying the pressurized air by the air pump to stir the ground ingredient and the hot water in the extractor,
      further supplying the pressurized air to extract the beverage from the extractor to a container, and
      when a supply amount of the beverage to the container is equal to or larger than a volume of the extractor, further supplying the hot water from the second pump to the extractor while extracting the beverage from the extractor to the container.

2. The beverage supply apparatus according to claim 1, wherein the instructions include changing a hot water supply rate by the hot-water supply unit in accordance with a type of the beverage to be supplied.

3. The beverage supply apparatus according to claim 1, wherein the instructions include changing a pressure of the pressurized air supplied from the air pump to the extractor in accordance with a type of the beverage to be supplied.

4. The beverage supply apparatus according to claim 1, wherein the instructions include contacting the hot water supplied from in the auxiliary tank with an inner wall surface of a cylinder included in the extractor by the second pump to swirl the hot water in the extractor.

5. The beverage supply apparatus according to claim 1, wherein a feeding amount by the second pump is larger than a feeding amount by the first pump.

6. The beverage supply apparatus according to claim 1, wherein a cylinder included in the extractor and having a substantially cylindrical shape includes sealing opening edge portions of an upper opening and a lower opening sealed by seal members.

7. The beverage supply apparatus according to claim 6, wherein the seal members each have a plurality of projecting pieces formed mutually separated on inner circumferential surfaces, and are fitted into mounting recess portions formed in the opening edge portions to seal the opening edge portions by abutting the projecting pieces against inner surfaces of the mounting recess portions while elastically deforming the projecting pieces.

8. The beverage supply apparatus according to claim 7, wherein the seal members include locking protrusions projecting outward in a radial direction on a part of outer circumferential surfaces, and are fitted into the mounting recess portions to seal the opening edge portions by inserting the locking protrusions into locking holes formed in the mounting recess portions from an inner side.

\* \* \* \* \*